(12) United States Patent
Amitai

(10) Patent No.: US 6,829,095 B2
(45) Date of Patent: Dec. 7, 2004

(54) SUBSTRATE-GUIDED OPTICAL BEAM EXPANDER

(75) Inventor: Yaakov Amitai, Rehovot (IL)

(73) Assignee: Lumus, Ltd. (IL)

( * ) Notice: Subject to any disclaimer, the term of this patent is extended or adjusted under 35 U.S.C. 154(b) by 0 days.

(21) Appl. No.: 10/297,261

(22) PCT Filed: May 16, 2001

(86) PCT No.: PCT/IL01/00432
§ 371 (c)(1),
(2), (4) Date: Apr. 11, 2003

(87) PCT Pub. No.: WO01/95027
PCT Pub. Date: Dec. 13, 2001

(65) Prior Publication Data
US 2003/0165017 A1 Sep. 4, 2003

(30) Foreign Application Priority Data
Jun. 5, 2000 (IL) .................................................. 136562

(51) Int. Cl.[7] .............................. G02B 27/14; G02B 6/04
(52) U.S. Cl. ........................ 359/630; 359/629; 359/636; 385/120
(58) Field of Search .......................... 359/34, 629, 630, 359/636; 385/27, 120

(56) References Cited

U.S. PATENT DOCUMENTS

| | | | |
|---|---|---|---|
| 4,711,512 A | 12/1987 | Upatnieks | 345/7 |
| 4,798,448 A | 1/1989 | van Raalte | 349/62 |
| 5,096,520 A | 3/1992 | Faris | 156/99 |
| 5,896,232 A | 4/1999 | Budd et al. | 359/630 |
| 5,966,223 A | 10/1999 | Friesem et al. | 359/16 |
| 6,580,529 B1 * | 6/2003 | Amitai et al. | 359/13 |

FOREIGN PATENT DOCUMENTS

| | | | | |
|---|---|---|---|---|
| DE | 19725262 | 6/1997 | | G02B/27/09 |
| WO | WO 99/52002 | 10/1999 | | G02B/5/32 |
| WO | WO 00/04407 | 1/2000 | | G02B/6/04 |

* cited by examiner

Primary Examiner—David N. Spector

(57) ABSTRACT

The invention provides an optical device, including a light-transmitting substrate, optical means for coupling light into the substrate by total internal reflection, and a plurality of partially reflecting surfaces carried by the substrate, characterized in that the partially reflecting surfaces are parallel to each other and are not parallel to any of the edges of the substrate.

46 Claims, 23 Drawing Sheets

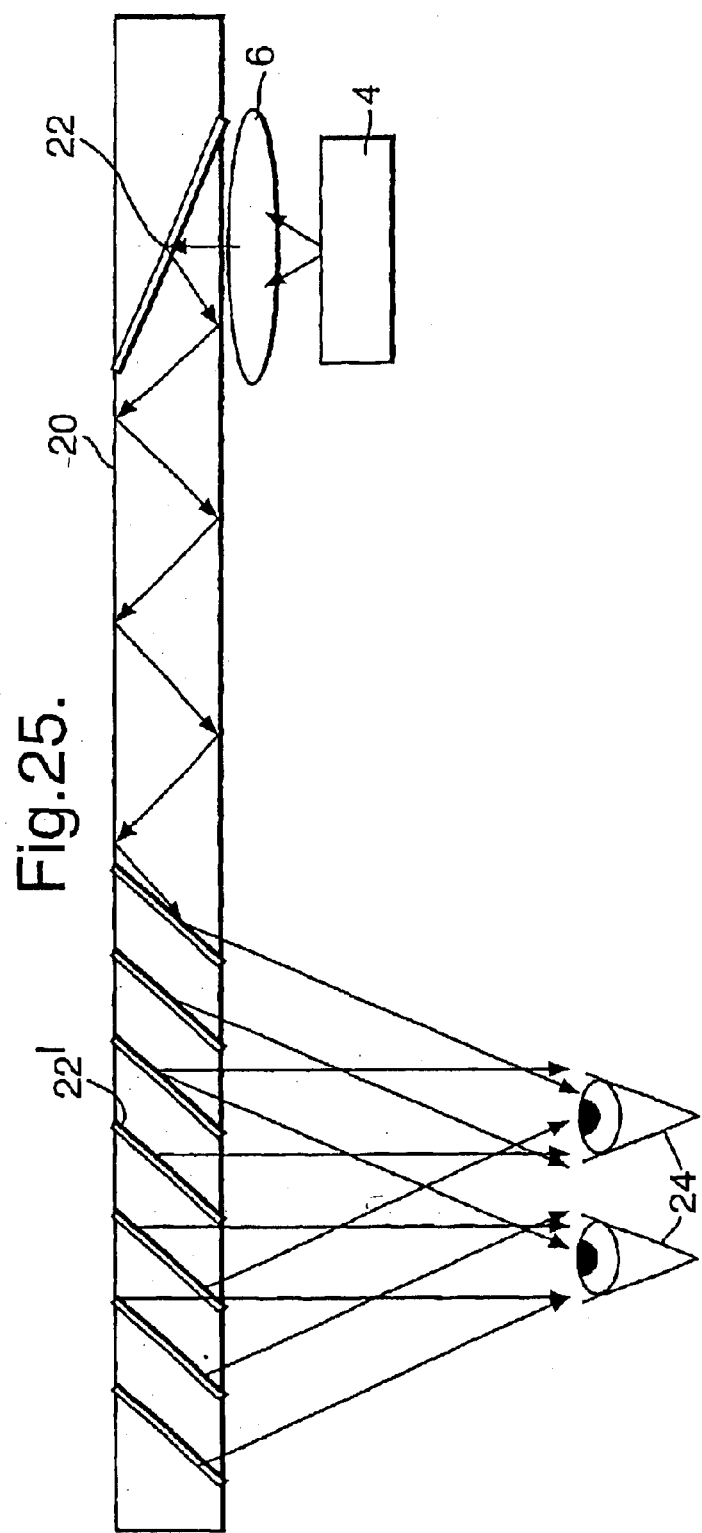

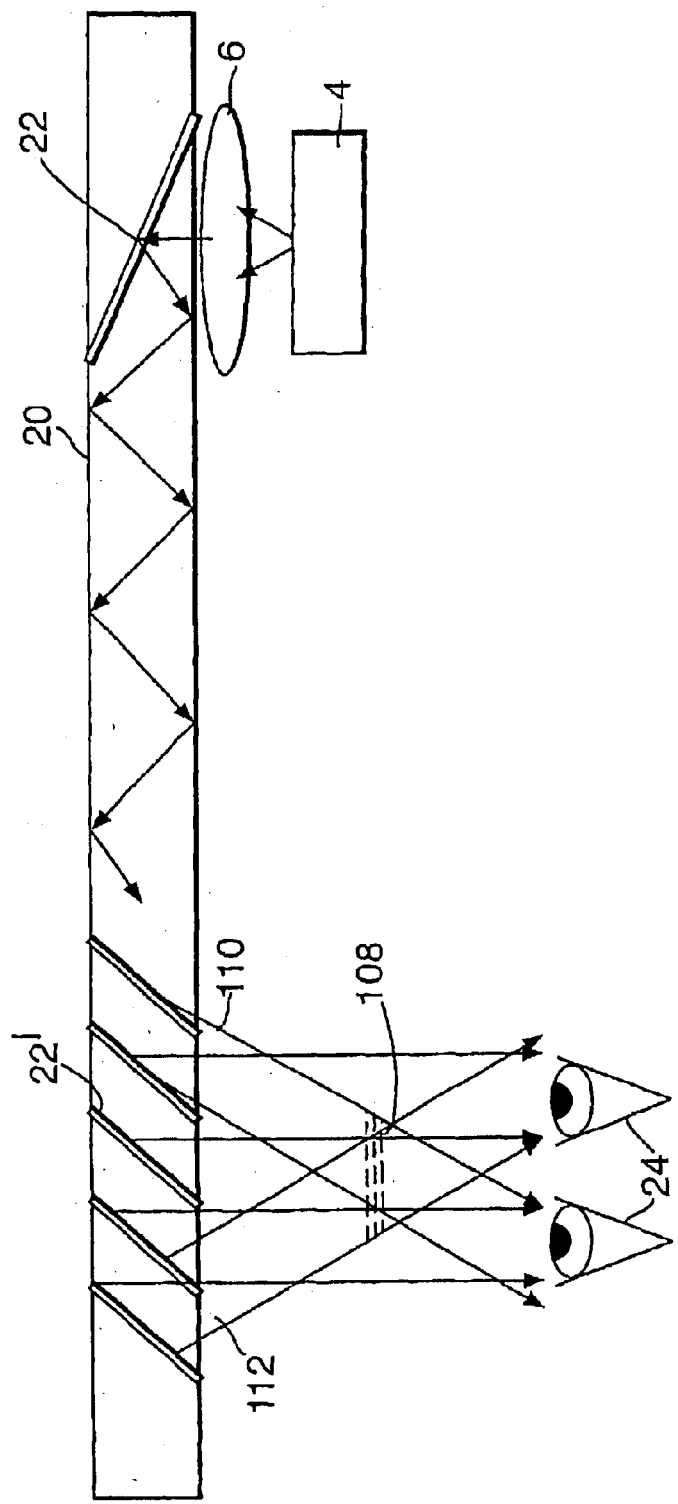

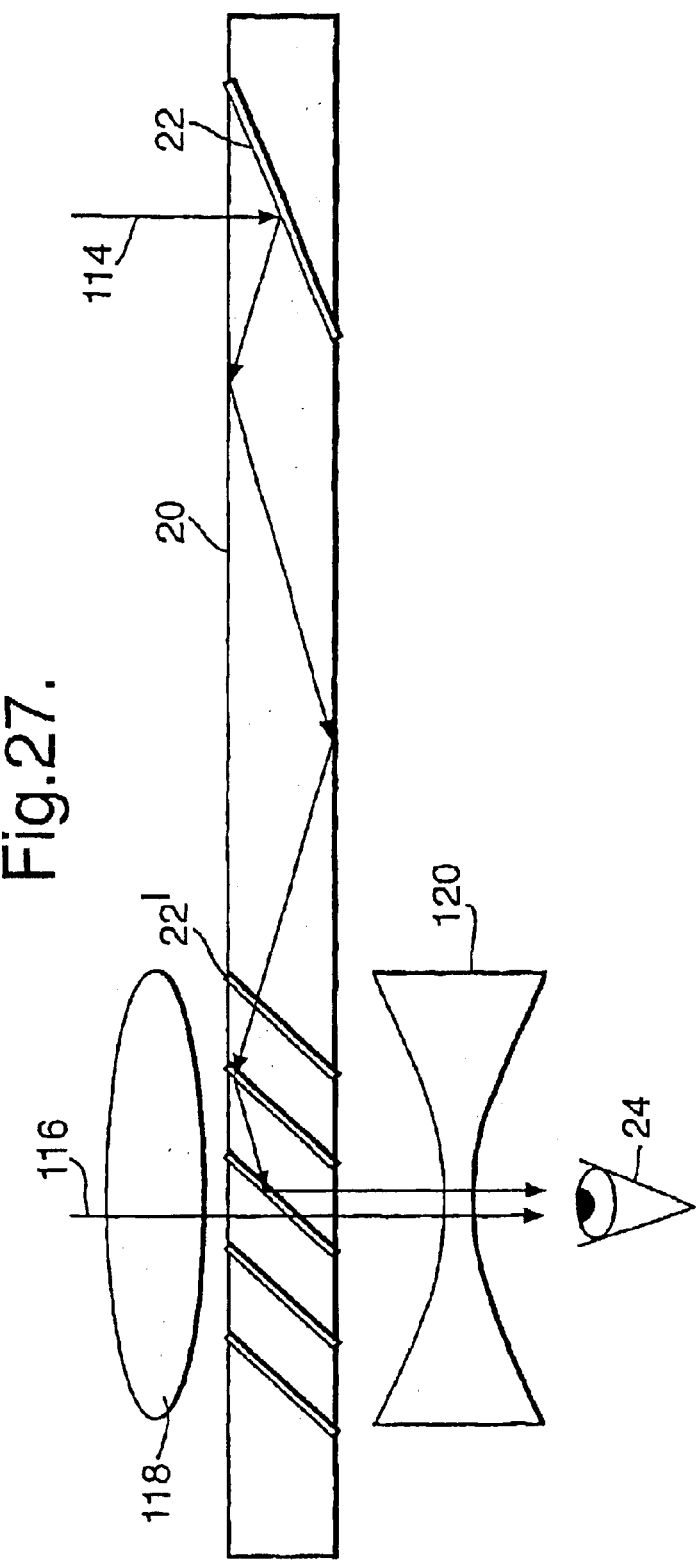

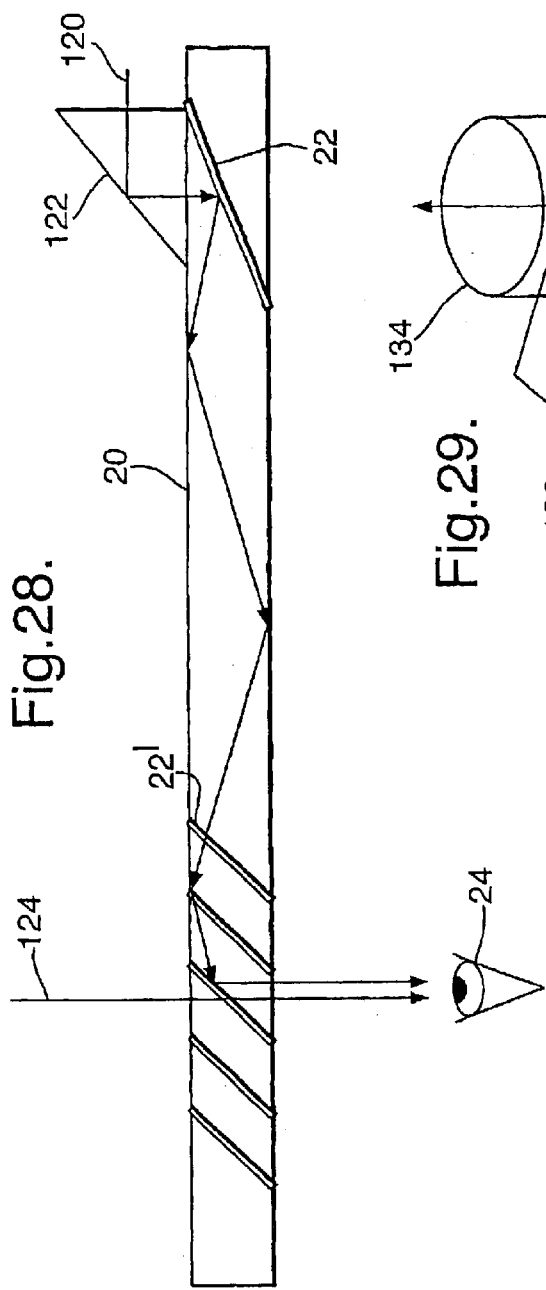
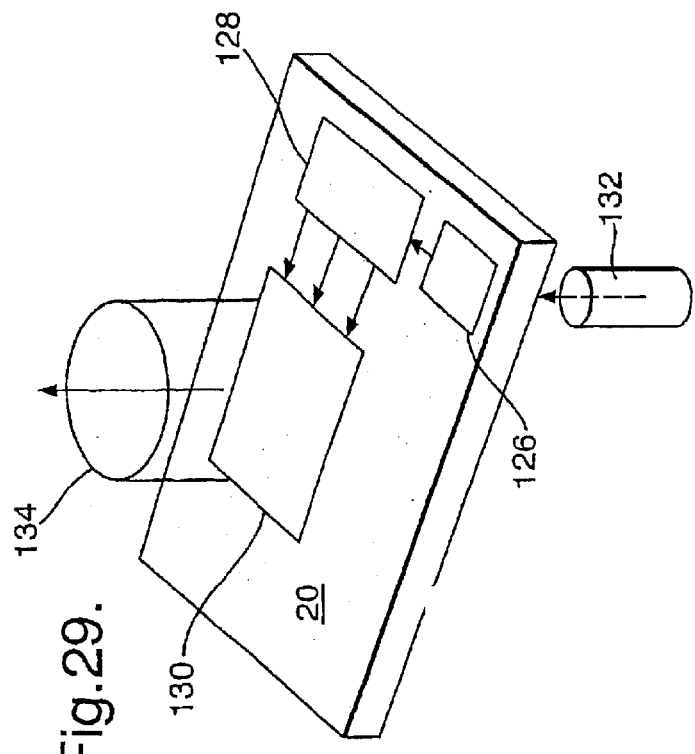

Fig.32.
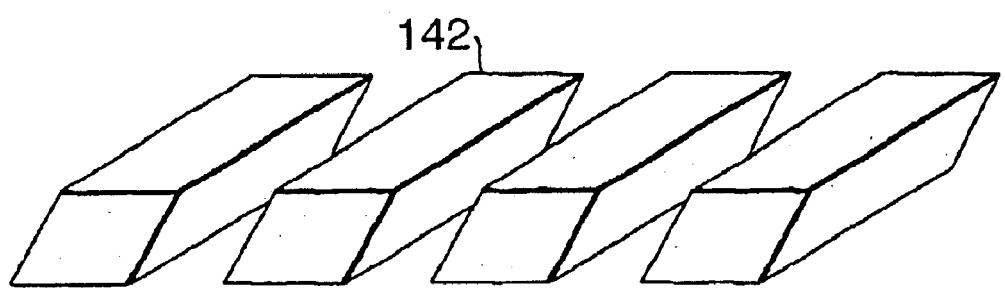
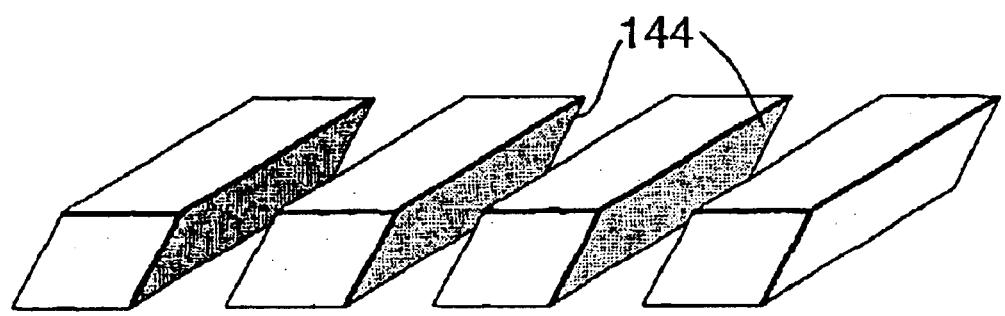
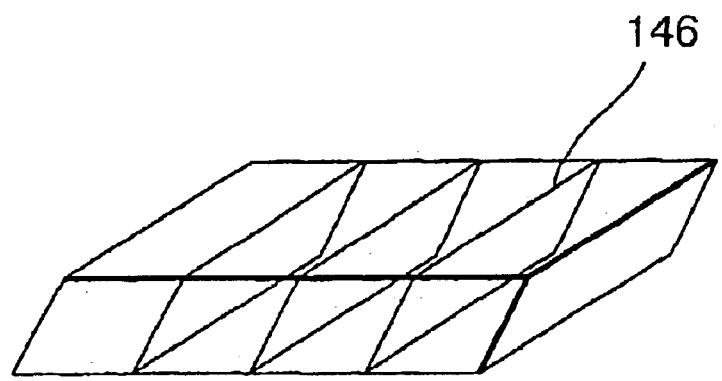

Fig.33.
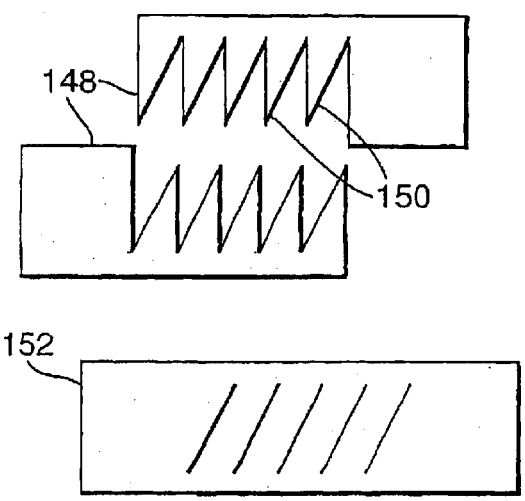
Fig.34.
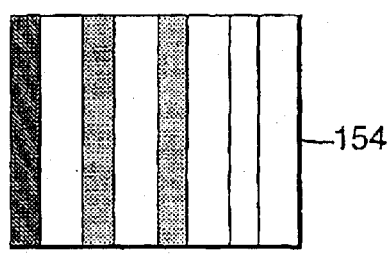
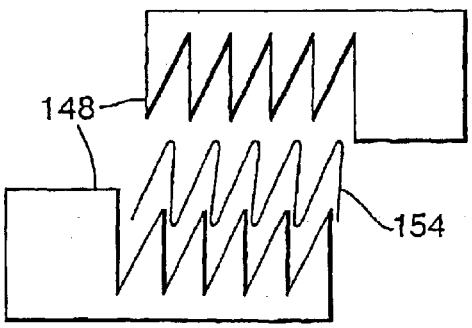
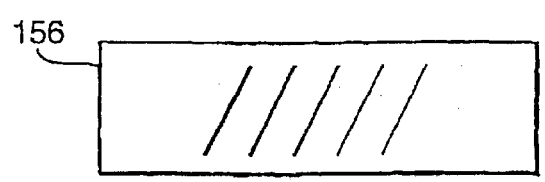

SUBSTRATE-GUIDED OPTICAL BEAM EXPANDER

FIELD OF THE INVENTION

The present invention relates to substrate-guided optical devices, and particularly to devices which include a plurality of reflecting surfaces carried by a common light-transmissive substrate.

The invention can be implemented in a large number of applications, such as, for example, head-mounted and head-up displays, compact displays, compact beam expanders and flat-panel illuminators.

BACKGROUND OF THE INVENTION

One of the important applications for compact optical elements is in head-mounted displays wherein an optical module serves both as an imaging lens and a combiner, in which a two-dimensional display is imaged to infinity and reflected into the eye of an observer. The display can be obtained directly, from either a cathode ray tube (CRT) or a liquid crystal display (LCD), or indirectly, by means of a relay lens or an optical fiber bundle. Typically, the display is comprised of an array of points which is imaged to infinity by a collimating lens and transmitted into the eye of the viewer by means of a partially reflecting surface acting as a combiner. Usually, a conventional, free-space optical module is used for these purposes. Unfortunately, however, as the desired field-of-view (FOV) of the system is increased, the optical module becomes heavier, bulky and very complicated to use. This is a major drawback in head-mounted applications, wherein the system should be as light and as compact as possible.

Other drawbacks of the existing designs are that with these designs, the overall optical systems are usually very complicated and difficult to manufacture. Furthermore, the eye-motion-box of the optical viewing angles resulting from these designs is usually very small—typically less than 8 mm. Hence, the performance of the optical system is very sensitive, even to small movements of the visor relative to the eye of the viewer.

DISCLOSURE OF THE INVENTION

The present invention may be used for designing and fabricating substrate-guided optical elements for visor displays in which the optical module is very compact and easy to use, even for systems with relatively high FOVs. In addition, the eye-motion-box of the optical system is relatively large and can therefore accommodate large movements of the visor. The system of the invention is particularly advantageous because it is very compact and can be readily incorporated, even into optical systems having specialized configurations.

The invention also enables the construction of improved head-up displays (HUDs). Since the inception of such displays more than three decades ago, there has been significant progress in the field. Indeed, HUDs have become so popular that they now play an important role, not only in all modern combat aircraft, but also in civilian aircraft, in which HUD systems play an important role during the landing operation. Furthermore, there have recently been numerous proposals and designs for the installation of HUDs in automobiles to assist in driving and navigation duties.

Yet the current form of HUDs has some severe drawbacks. The necessity to use a display source that must be located at some distance from the combiner so as to illuminate its whole surface, makes the HUDs bulky, large, and sometimes inconvenient and unsafe to use.

Another important application of the present invention is in providing a compact HUD which overcomes the above drawbacks. The combiner can be illuminated with a compact display source that is attached to the substrate. Hence, the overall system is very compact and can thus be installed easily and used in a variety of places and applications. In addition, the chromatic dispersion of the display is relatively small and, as such, the light source can have a wide spectrum, even like that of a conventional white-light source. In addition, the area of the display can be much larger than the area that is actually illuminated by the light source.

A further application of the present invention is to provide a compact beam expander. Beam expanders for magnifying a narrow collimated beam into a beam with a larger diameter, typically comprise a telescopic assembly of two lenses along a common axis, with a common focal point. The present invention provides a beam expander that can be used with both monochromatic and polychromatic light.

The broad object of the present invention, therefore, is to ameliorate the drawbacks of the known devices and to provide optical systems having improved performance, according to specific requirements.

The invention therefore provides an optical device comprising a light-transmitting planar substrate; optical means for coupling light into said substrate by total internal reflection, and a plurality of partially reflecting surfaces carried by said substrate, characterized in that said partially reflecting surfaces are parallel to each other and are not parallel or normal to the plane of said substrate.

BRIEF DESCRIPTION OF THE DRAWINGS

The invention will now be described in connection with certain preferred embodiments, with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of the simplest form of a prior art substrate-guided optical device;

FIG. 2 is a side view of a substrate-guided optical device in accordance with the present invention;

FIG. 3 illustrates the desired reflectance behavior of the partially reflecting surfaces for various incident angles;

FIG. 4 illustrates the reflectance curves for a diachronic coating;

FIG. 5 is a diagrammatic side view of a reflective surface according to the present invention;

FIGS. 6A and 6B are diagrams illustrating detailed side views of an array of partially reflective surfaces;

FIG. 7 is a side view of a device according to the present invention, utilizing a half-wavelength plate for rotating the polarization of incoming light;

FIG. 8 is a side view of a head-mounted display system according to the present invention;

FIG. 9 illustrates detailed side views of the reflectance from an array of partially reflective surfaces, for three different viewing angles;

FIG. 10 is a graph illustrating the results of simulations that calculate the brightness of the projected display, together with the outer scene;

FIG. 11 is a side view of a substrate-guided optical device according to another embodiment of the present invention;

Figure 12:
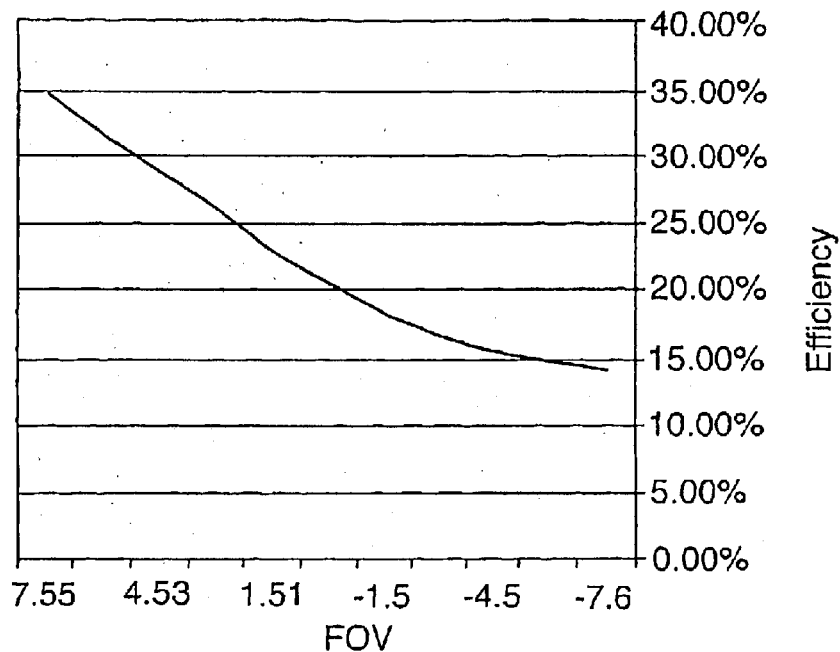
Figure 13:
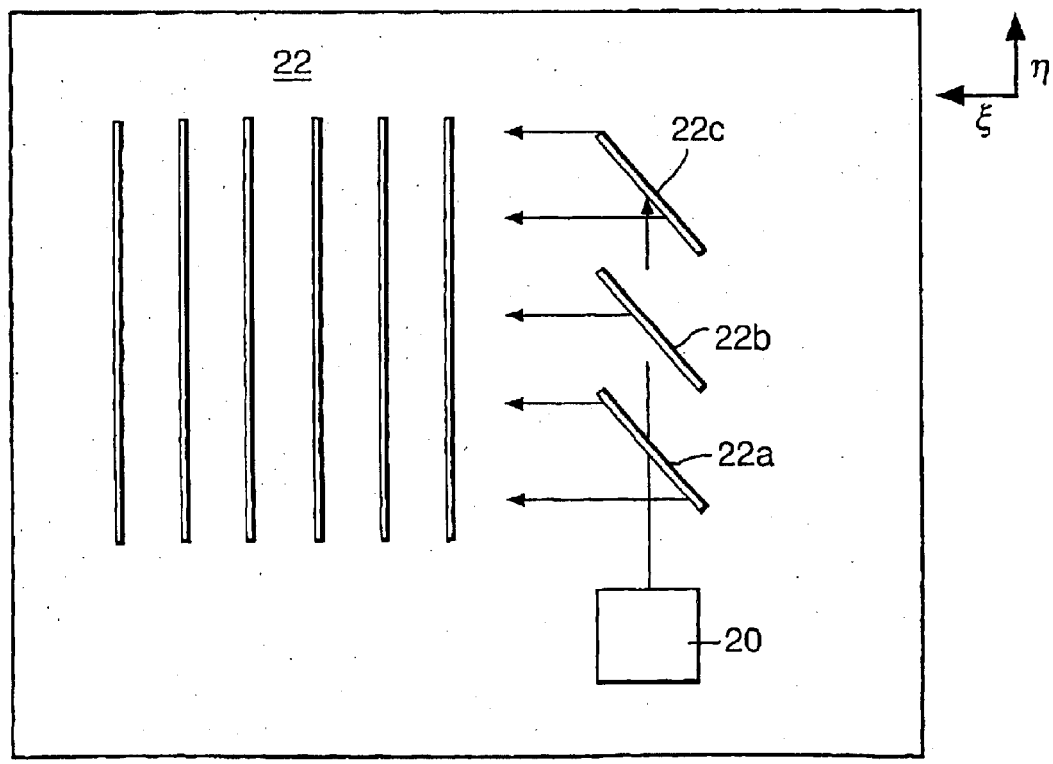
Figure 14:
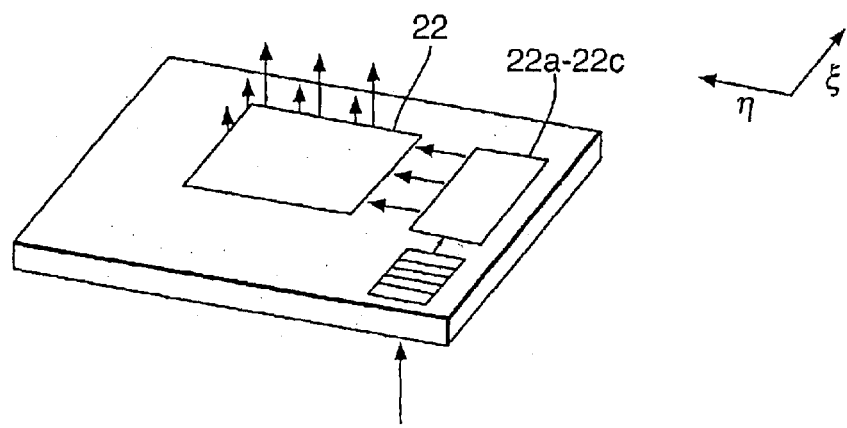
Figure 15:
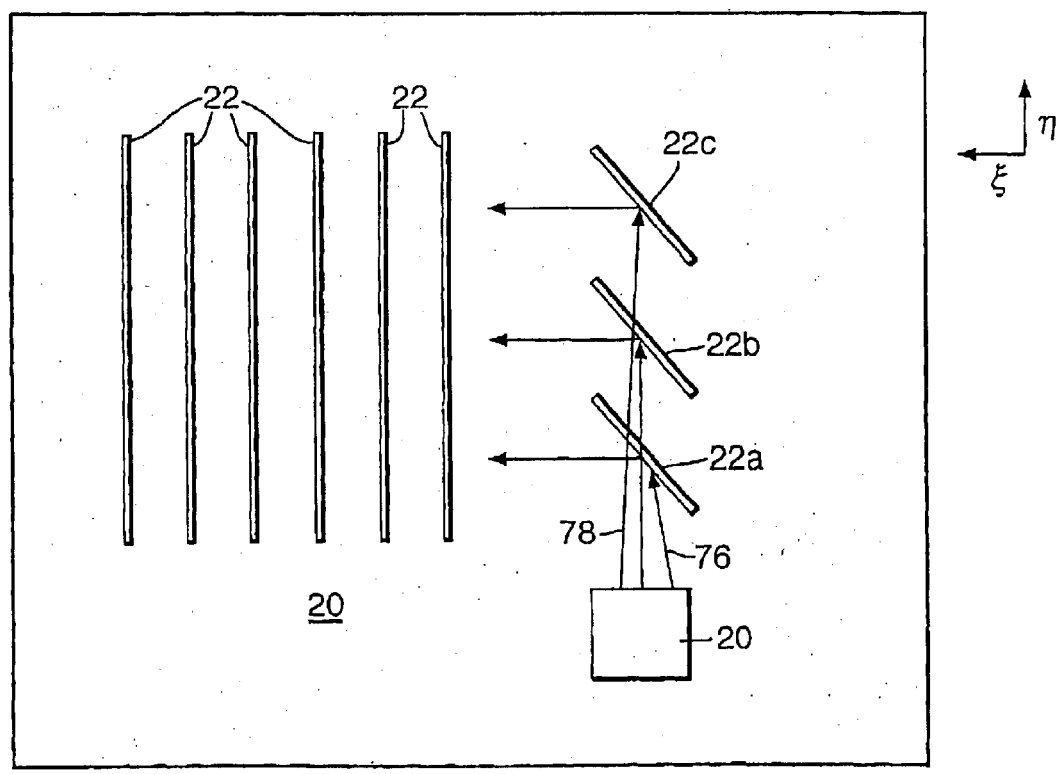
Figure 16:
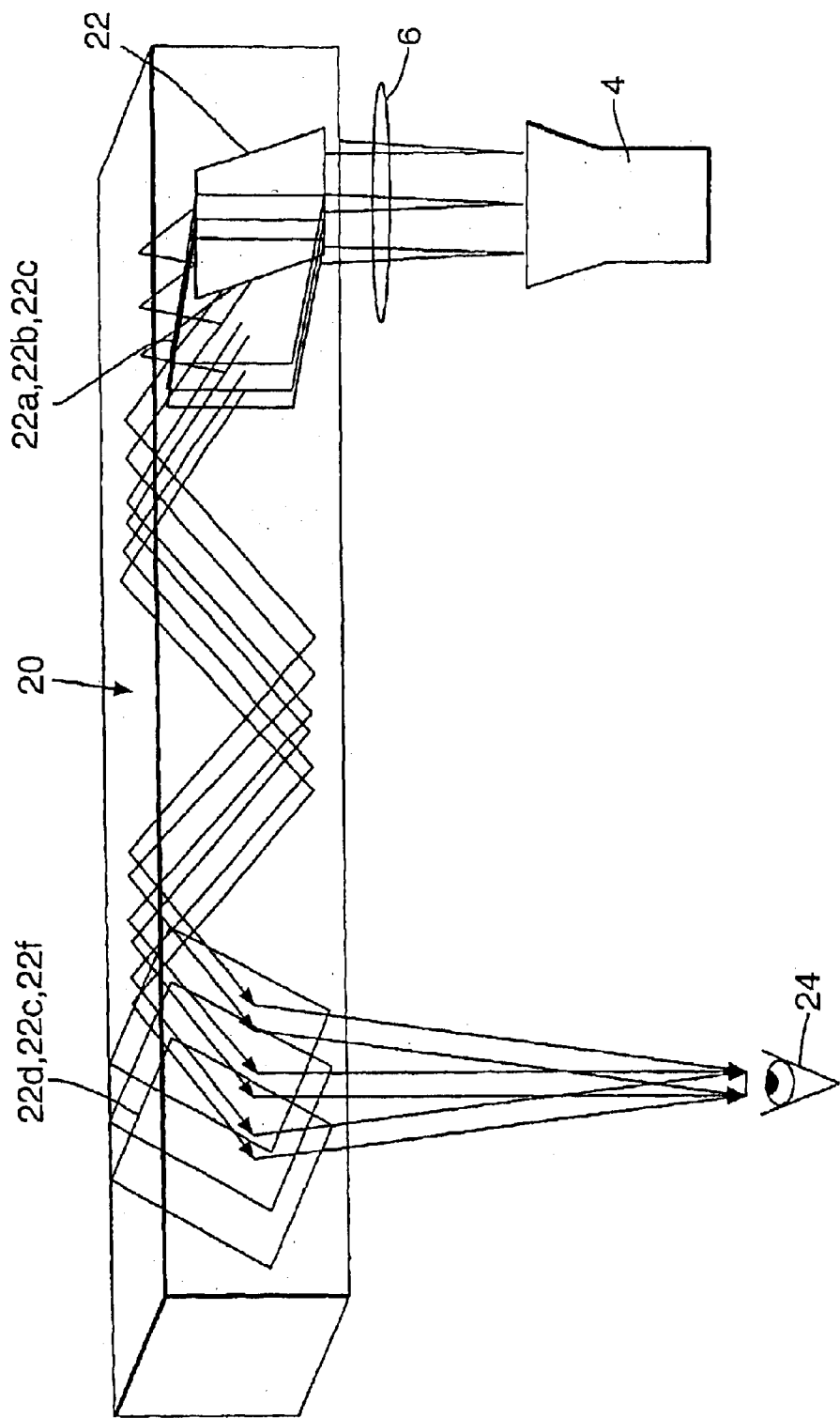
Figure 17:
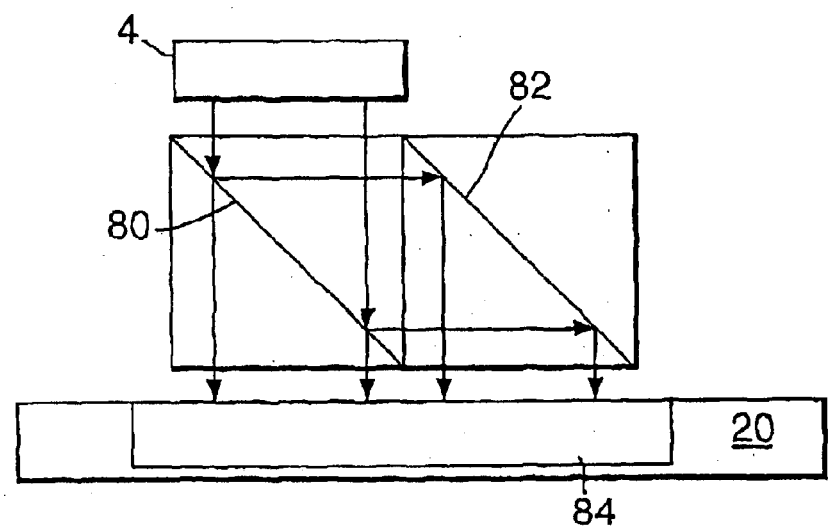
Figure 18:
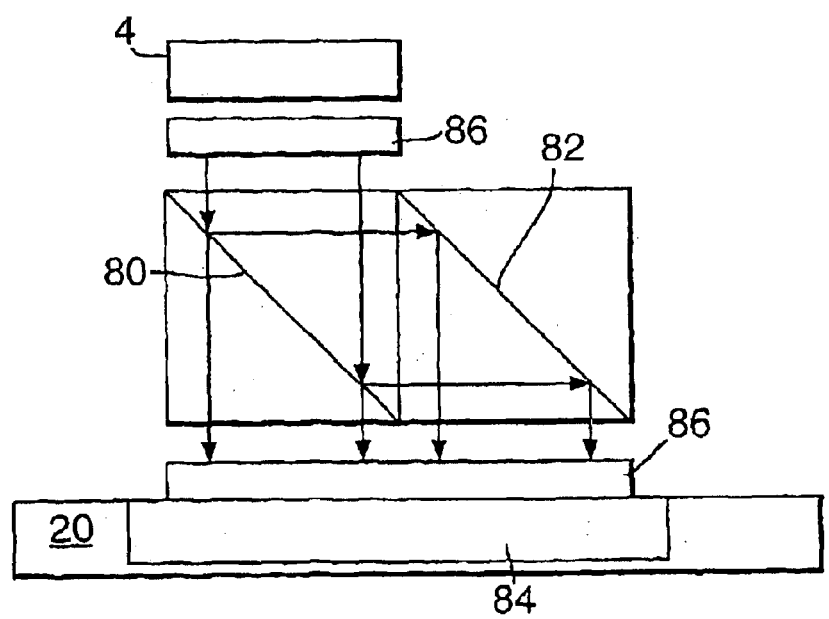
Figure 19:
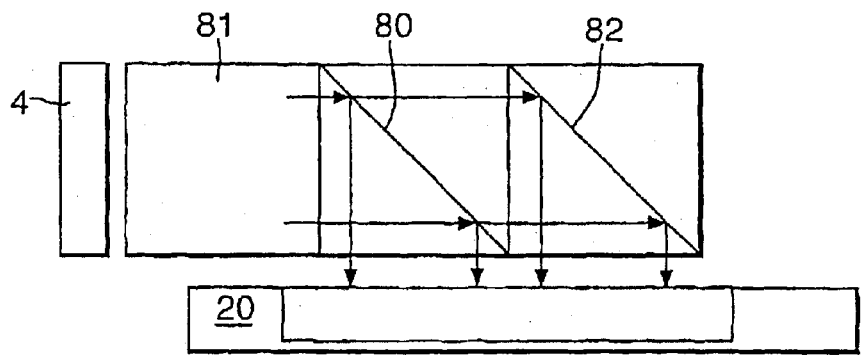
Figure 20:
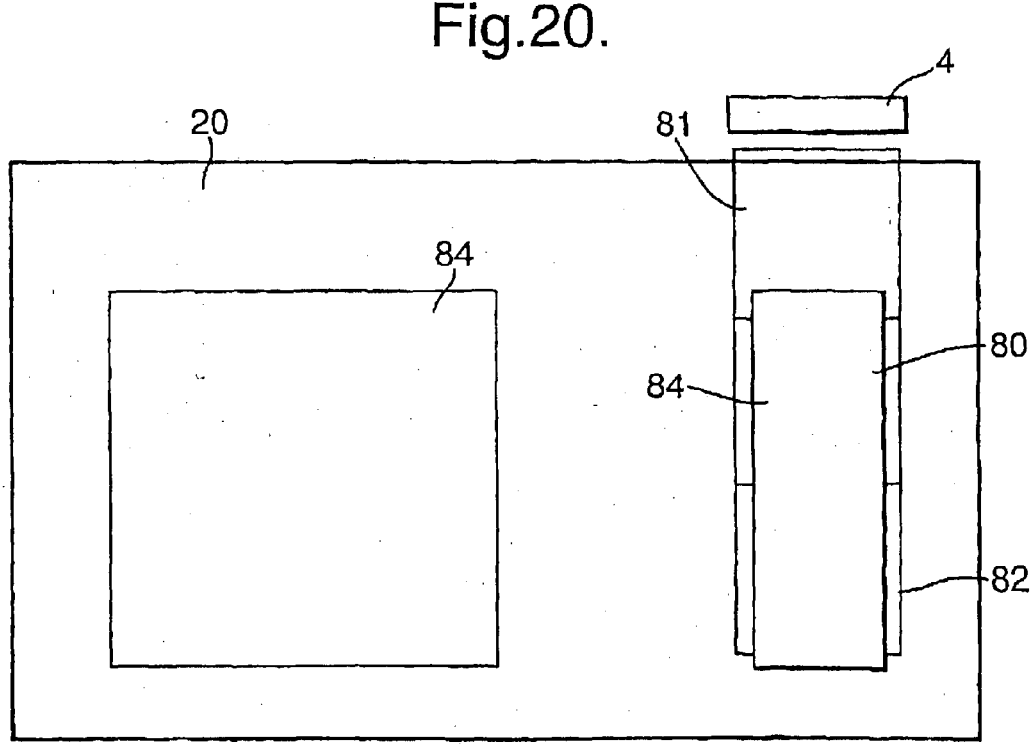
Figure 21:
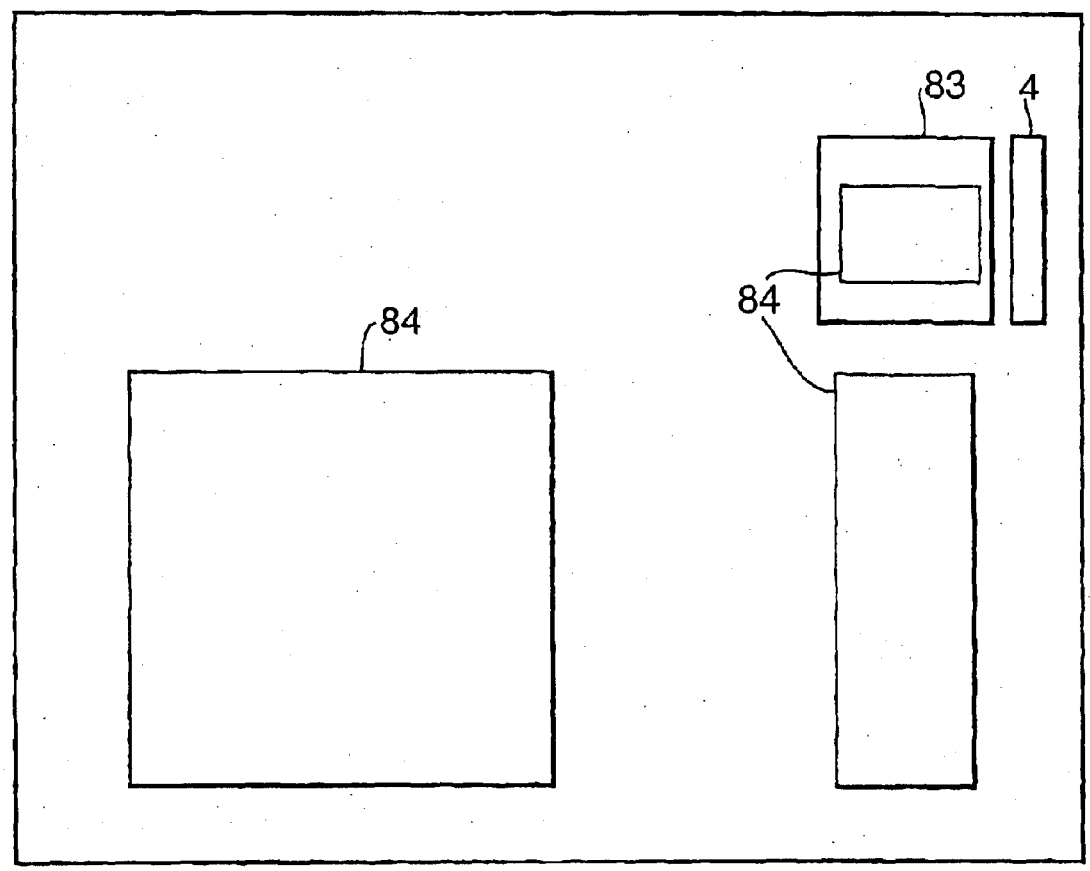
Figure 22:
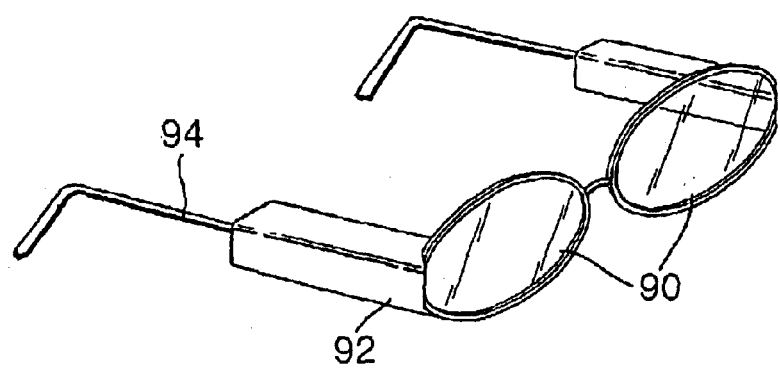
Figure 23:
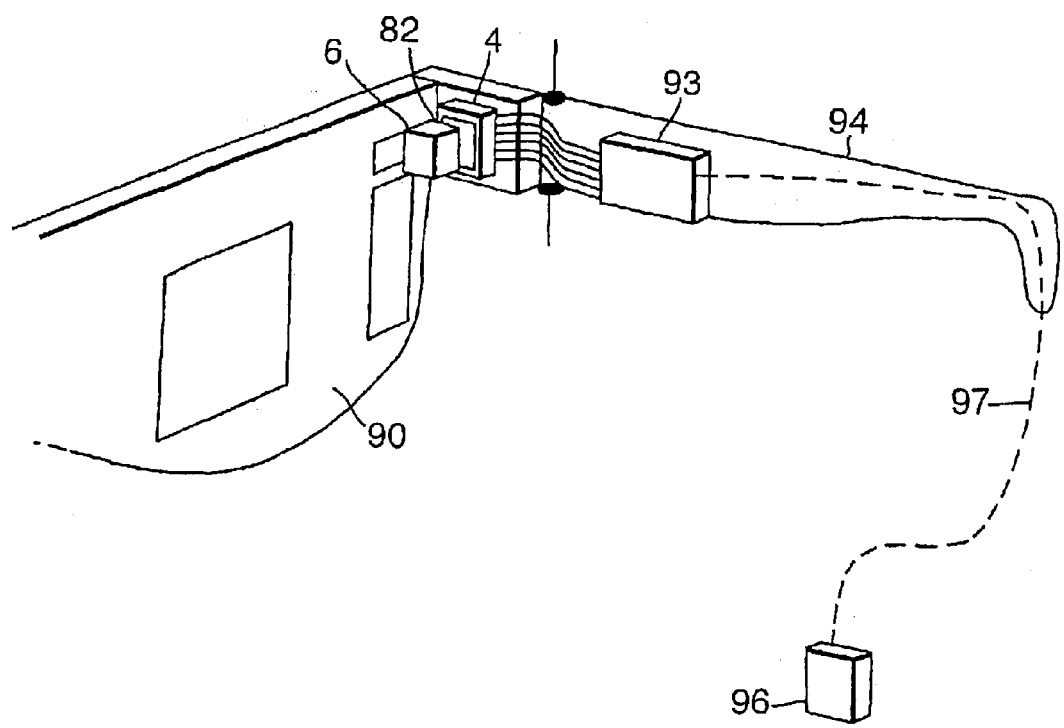
Figure 24:
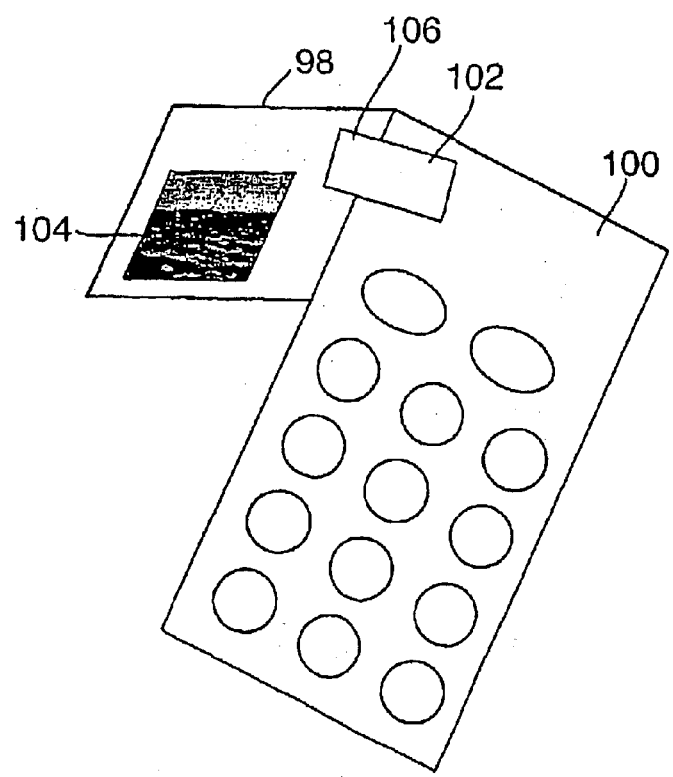
Figure 30:
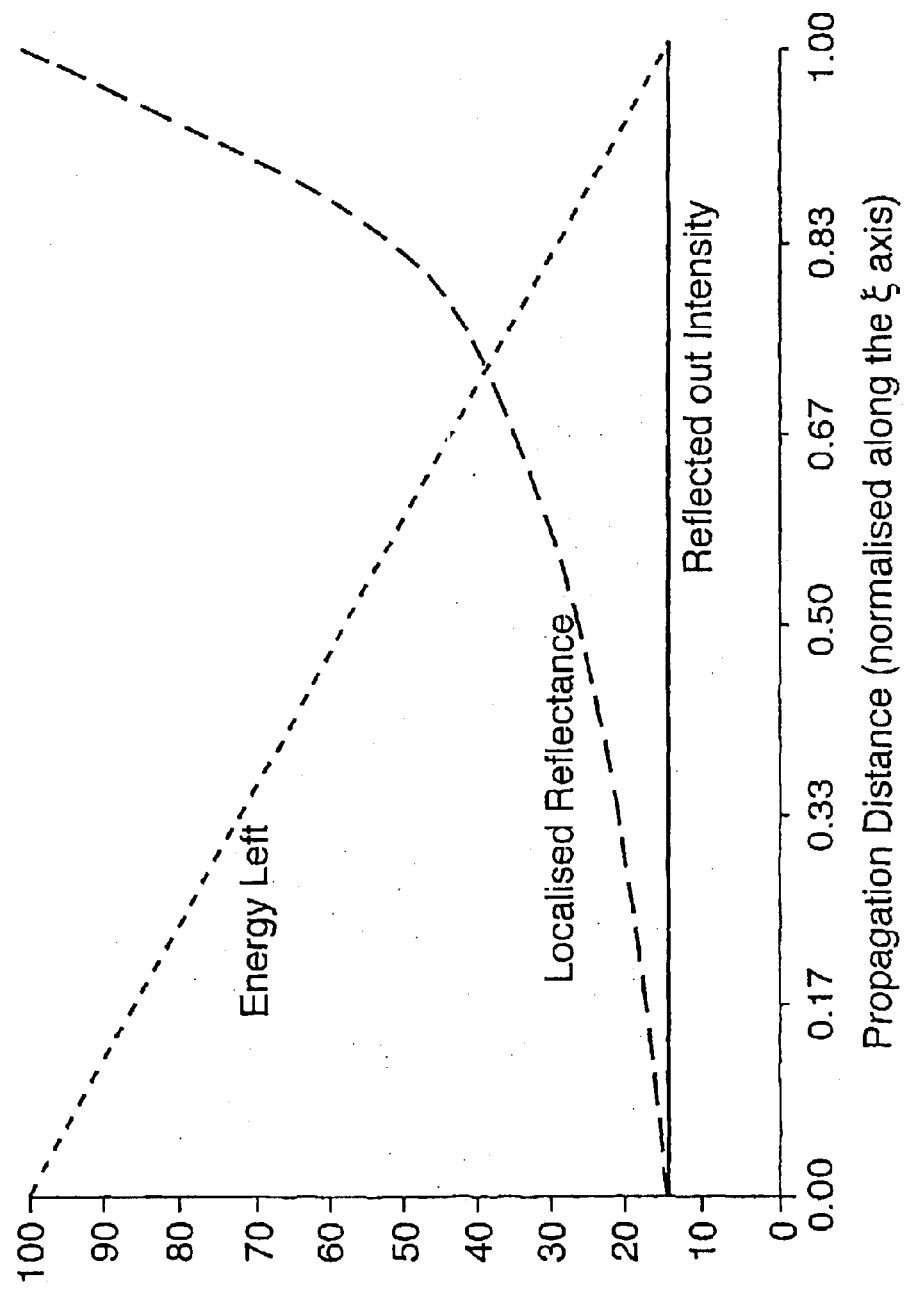
Figure 31A:
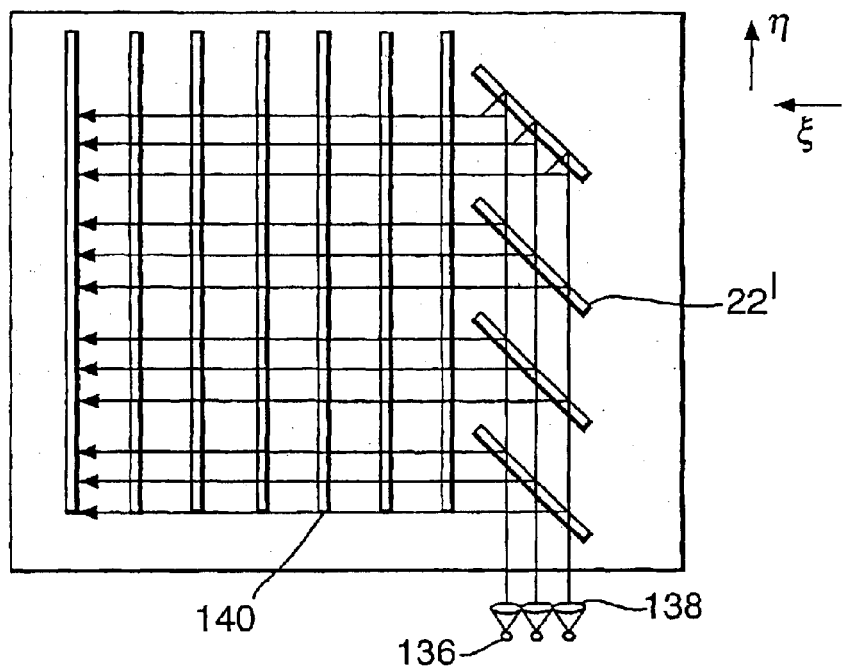
Figure 31B:
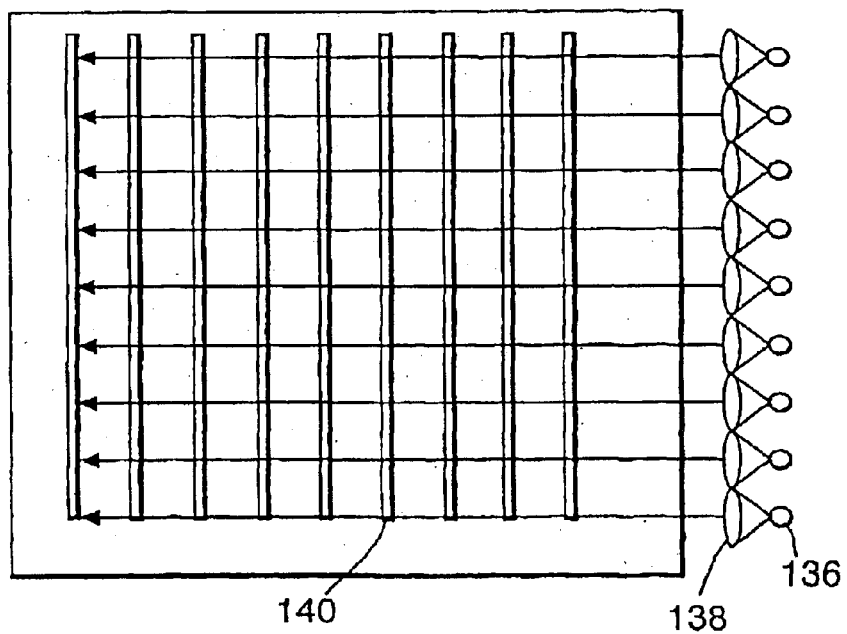
Figure 35:
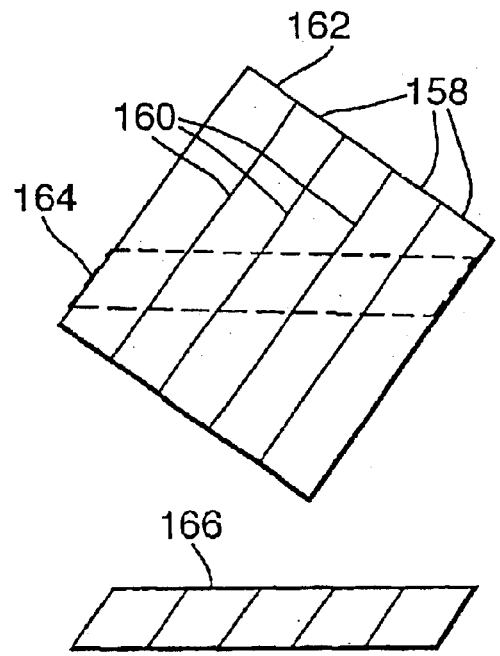
Figure 36:
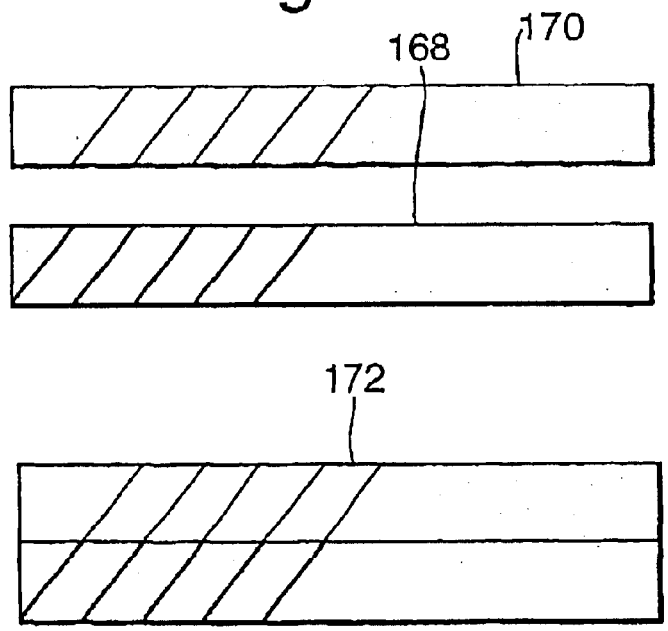

FIG. 12 is a diagram illustrating the efficiency of reflected light as a function of the FOV;

FIG. 13 is a diagram illustrating a substrate-guided optical configuration having three arrays of reflecting surfaces, according to the present invention;

FIG. 14 is a diagram illustrating a three-dimensional view of the overall substrate-guided optical device according to the present invention;

FIG. 15 is a diagram illustrating another view of a substrate-guided optical device having three arrays of reflecting surfaces, according to the present invention;

FIG. 16 is a three dimensional view of a compact, substrate-guided, head-mounted display according to the present invention;

FIG. 17 is a side view of an alternative configuration for expanding light according to the present invention;

FIG. 18 is a side view of another embodiment of the device according to the present invention;

FIGS. 19 and 20 are diagrams of modifications of the embodiment of FIG. 17;

FIG. 21 is a diagram of a further embodiment of the invention;

FIGS. 22 and 23 illustrate a still further embodiment of the present invention utilized in spectacles;

FIG. 24 is a diagram illustrating a method for utilizing the device with a mobile cellular telephone;

FIG. 25 illustrates an HUD system in accordance with the present invention;

FIG. 26 is a diagram illustrating an alternative embodiment of an HUD system having a larger total FOV, according to the present invention;

FIG. 27 illustrates an embodiment for implementing a lens having a double focal length, according to the present invention;

FIG. 28 is a diagram illustrating a method of combining two aspects of the external scene onto the eye of the viewer, using a device according to the present invention;

FIG. 29 is a diagram illustrating a compact SGOD beam-expander for illumination purposes, according to the present invention;

FIG. 30 illustrates a curve showing the intensity of the output wave as a function of the propagation distance inside the substrate along the $\xi$ axis;

FIGS. 31A and 31B are diagrams illustrating compact SGOD beam-expander configurations for illumination purposes, according to the present invention;

FIG. 32 is a diagram illustrating a method for fabricating an array of partially reflecting surfaces according to the present invention;

FIG. 33 is a diagram illustrating another method for fabricating an array of partially reflecting surfaces according to the present invention;

FIG. 34 is a diagram illustrating a further method for fabricating an array of partially reflecting surfaces according to the present invention;

FIG. 35 is a diagram illustrating a still further method for fabricating an array of partially reflecting surfaces according to the present invention, and FIG. 36 is a diagram illustrating a method for achieving non-uniform coatings on the reflecting surfaces, in accordance with the present invention.

DETAILED DESCRIPTION OF PREFERRED EMBODIMENTS

Figure 1:
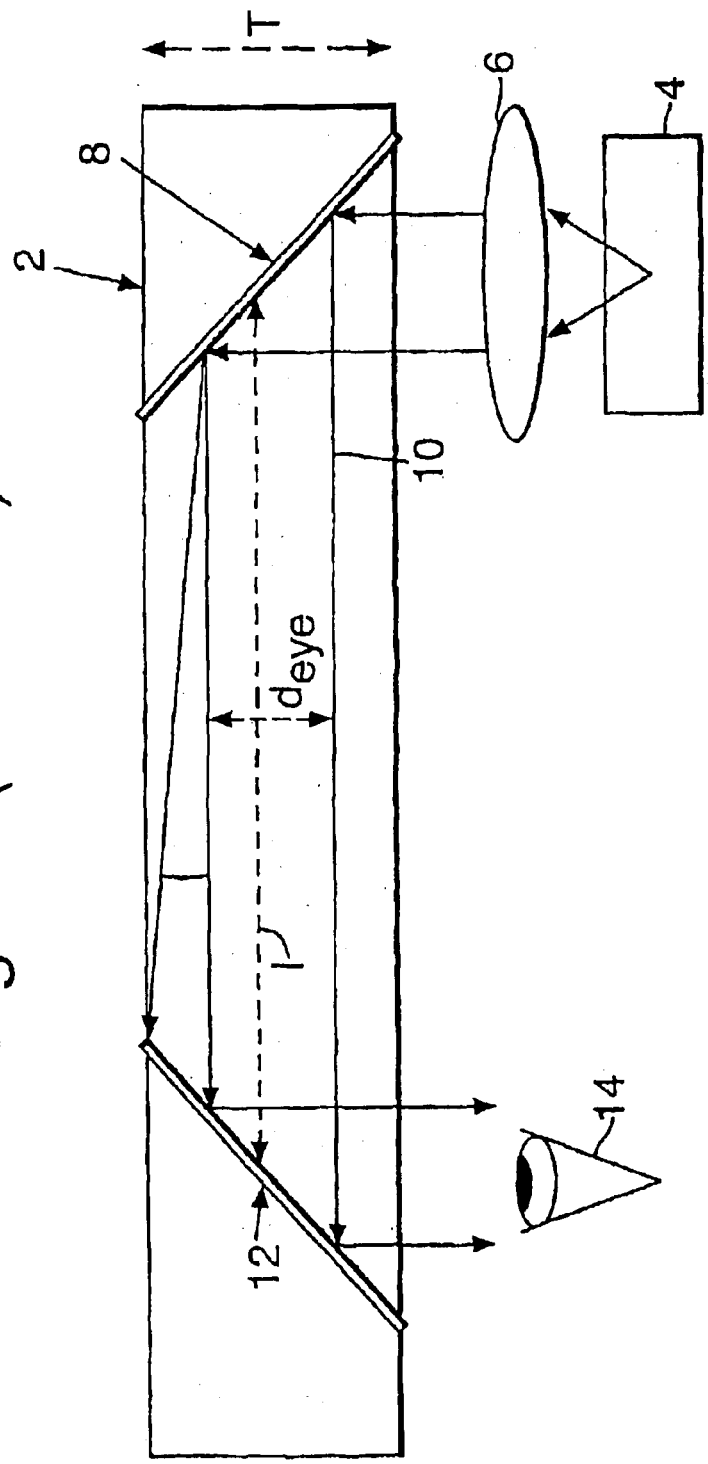

FIG. 1 illustrates the simplest form of a SGOD, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye of a viewer 14. Despite the compactness of this configuration, it does suffer some severe drawbacks, the principal one being that the FOV which can be achieved is very limited. As shown in FIG. 1, the maximum allowed off-axis angle inside the substrate is:

$$\alpha_{max} = \arctan\left(\frac{T - d_{eye}}{2l}\right), \quad (1)$$

wherein

T is the substrate thickness;
$d_{eye}$ is the desired exit-pupil diameter, and
l is the distance between reflecting surfaces 8 and 10.

With angles higher than $\alpha_{max}$ the rays will be reflected from the substrate surface before arriving at the reflecting surface 10. Hence, the reflecting surface 10 will be illuminated at a non-desired direction and ghost images will be created.

Therefore, the maximum achievable FOV with this configuration is:

$$FOV_{max} \approx 2\nu\alpha_{max}, \quad (2)$$

wherein $\nu$ is the refractive index of the surface 8, which will usually have values in the range of 1.5–1.6.

Typically, the diameter of the eye pupil is 2–6 mm. However, so as to accommodate movement of the display, a larger exit-pupil diameter is necessary. The minimum acceptable value is therefore approximately 8 mm. For an average head, l is between 40 and 60 mm. Consequently, even for a small FOV of 8°, the desired substrate thickness would be of the order of 12 mm.

Recently, a few methods have been proposed to overcome the above problem, such as utilizing a magnifying telescope inside the substrate, non-parallel coupling directions and more. However, even with these solutions, using only a single surface reflecting onto the eye, yields a similar limitation. The FOV is limited by the diameter of the projection of the reflective surface 12 on the substrate plane. It is easy to see that the maximum achievable FOV, due to this limitation, is:

$$FOV_{max} \approx \frac{T \tan \alpha_{sur} - d_{eye}}{R_{eye}}, \quad (3)$$

wherein $\alpha_{sur}$ is the angle between the reflecting surface and the normal to the substrate plane, and $R_{eye}$ is the distance between the eye of the viewer and the substrate (typically, about 30–40 mm).

Usually, $\tan \alpha_{sur}$ cannot be larger than 2; hence, for the same assumptions as described above for a FOV of 8°, the desired substrate thickness is in the order of 7 mm, which is a more reasonable limitation. However, when the desired FOV is increased, the substrate thickness becomes rapidly thicker. For instance, desired FOVs of 15° and 30° yield substrate thicknesses of 9 mm and 14 mm, respectively.

Figure 2:
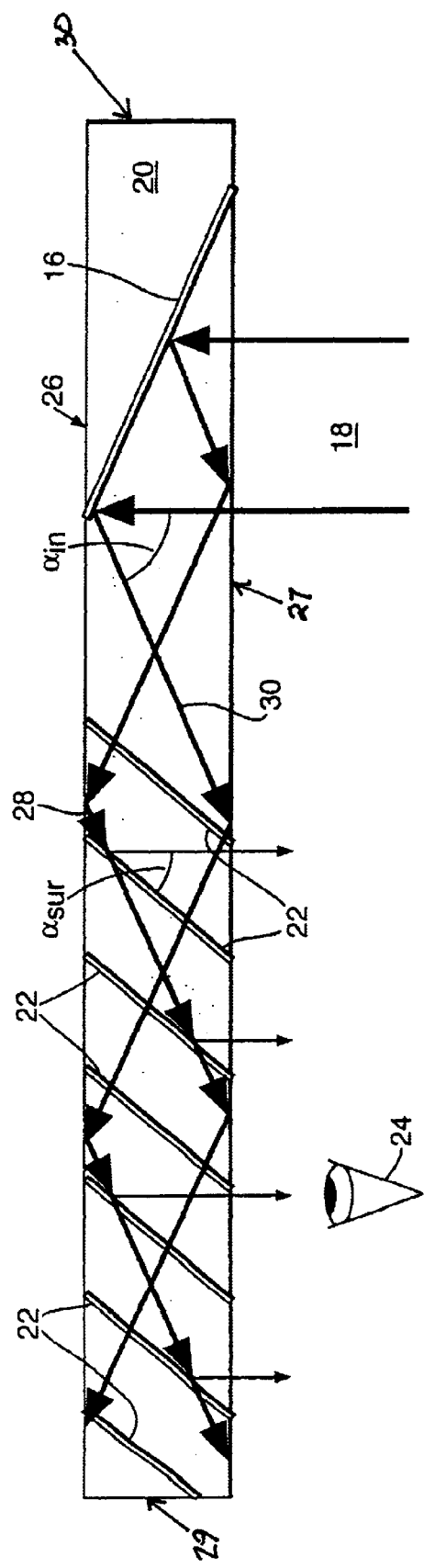

In order to overcome the above limitations, the present invention utilizes an array of partially reflecting surfaces. FIG. 2 illustrates a side view of a substrate-guided optical device 20, having two major surfaces 26 and 27 and two edges 29 and 30, according to the present invention. The first reflecting surface 16 is illuminated by a collimated display 18 emanating from a source (not shown) which is located behind the device. The reflecting surface 16 reflects the incident light from the source such that the light is trapped inside a planar substrate 20 by total internal reflection. After a few reflections inside the substrate, the trapped waves reach a parallel array of partially reflecting surfaces 22, which couple the light out of the substrate into the eye of a viewer 24. Assuming that the central wave of the source is coupled out of the substrate 20 in a direction normal to the substrate surface 26, and the off-axis angle of the diffracted wave inside the substrate 20 is $\alpha_{in}$, then the angle $\alpha_{sur2}$ between the reflecting surfaces and the normal to the substrate plane is:

$$\alpha_{sur2} = \frac{\alpha_{in}}{2}. \quad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26, wherein the incident angle $\beta_{ref}$ between the trapped ray and the normal to the reflecting surface is:

$$\beta_{ref} = 90° - (\alpha_{in} - \alpha_{sur2}) = 90° - \frac{\alpha_{in}}{2}. \quad (5)$$

The trapped rays arrive at the reflecting surface from the second direction 30 after an odd number of reflections from the substrate surfaces 26, where the off-axis angle is $\alpha'_{in} = 180° - \alpha_{in}$ and the incident angle between the trapped ray and the normal to the reflecting surface is:

$$\beta'_{ref} = 90° - (\alpha'_{in} - \alpha_{sur2}) \quad (6)$$
$$= 90° - (180° - \alpha_{in} - \alpha_{sur2})$$
$$= -90° + \frac{3\alpha_{in}}{2}.$$

In order to prevent undesired reflections and ghost images, it is important that the reflectance be negligible for one of these two directions. Fortunately, the desired discrimination between the two incident directions can be achieved if one angle is significantly smaller then the other one. One solution to this requirement is the case in which $\beta_{ref} \sim 0°$. Inserting this value into Equation (5) yields $\alpha_{in} \sim 180°$. Clearly, this solution is not practically feasible. The second solution is the case in which $\beta'_{ref} \sim 0°$, yielding:

$$\beta_{ref} = 60°; \alpha_{in} = 60°; \alpha'_{in} = 120°; \alpha_{sur2} = 30°. \quad (7)$$

Figure 3:
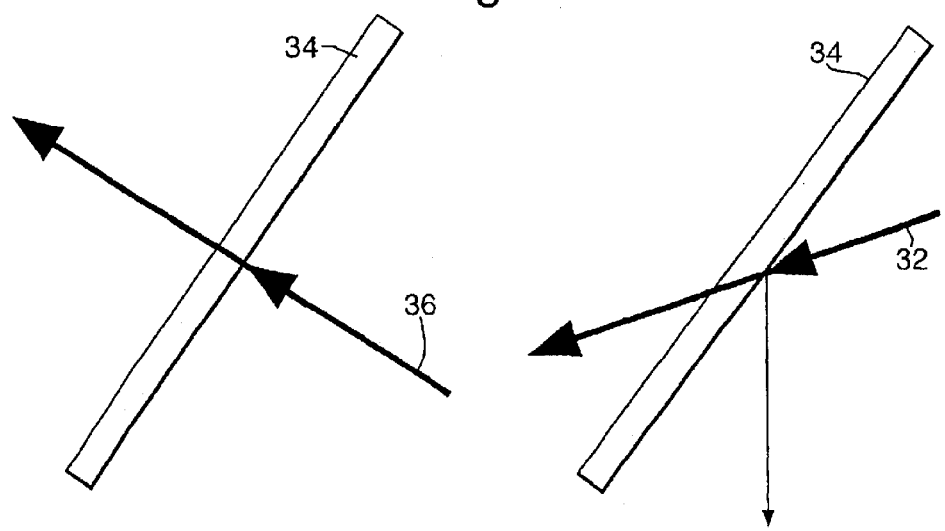

FIG. 3 illustrates the desired reflectance behavior of the partially reflecting surfaces. While the ray 32, having an off-axis angle of $\beta_{ref} \sim 60°$, is partially reflected and coupled out of the substrate 34, the ray 36, which arrives normal to the reflecting surface, is transmitted through the reflecting surface 34 without any notable reflection.

Figure 4:
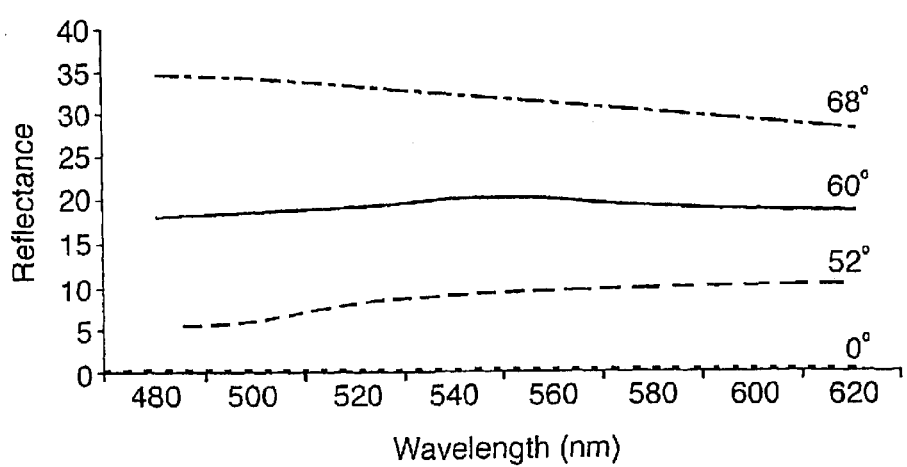

FIG. 4 illustrates the reflectance curves of a dichroic coating designed to achieve the desired aim, for four different incident angles: 0°, 52°, 60° and 68°. While the reflectance of the normal ray is negligible over the entire relevant spectrum, the rays at an off-axis of 60° obtain an almost constant reflectance of 20% over the same spectrum. Evidently, reflectance increases with the obliquity of the incident rays.

It is clear that the reflectance of the first reflecting surface should be as high as possible, so as to couple as much light as possible from the display source onto the substrate. Assuming that the central wave of the source is normally incident onto the substrate, i.e., $\alpha_0 = 180°$, then the angle $\alpha_{sur1}$ between the first reflecting surface and the normal to the substrate plane is:

$$\alpha_{sur1} = \frac{\alpha_{in} + \alpha_0}{2}; \alpha'_{sur1} = \frac{\alpha'_{in} + \alpha_0}{2}. \quad (8)$$

The solutions for $\alpha_{sur1}$ and $\alpha'_{sur1}$ in this case are 120° and 150°, respectively.

Figure 5:
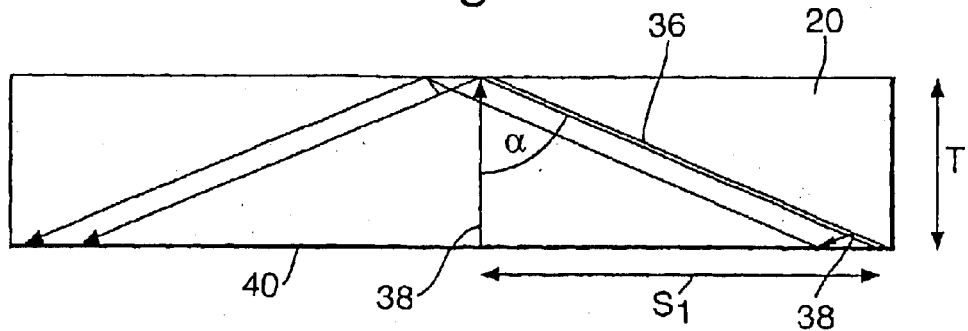

FIG. 5 presents a side view of the reflective surface 36 which couples light 38 from a display source (not shown) and traps it inside the substrate 20 by total internal reflection. As plotted here, the projection $S_1$ of the reflecting surface on the substrate surface 40 is:

$$S_1 = T \cdot \tan(\alpha), \quad (9)$$

wherein

T is the substrate thickness.

Clearly, the solution of $\alpha = \alpha_{sur1}$ is the preferred one, since the coupling area on the substrate surface is three times larger than it is for the other solution. Assuming that the coupled wave illuminates the entire area of the reflecting surface, after reflection from the surface 36, it illuminates an area of $2S_1 = 2T \tan(\alpha)$ on the substrate surface. On the other hand, the projection of a reflection surface 36 on the substrate plane is $S_2 = T \tan(\alpha_{sur2})$. To avoid either overlapping or gaps between the reflecting surfaces, the projection of each surface is adjacent to its neighbor. Hence, the number N of reflecting surfaces 36 through which each coupled ray passes during one cycle (i.e., between two reflections from the same surface of the substrate) is:

$$N = \frac{2S_1}{S_2} = \frac{2T \cdot \tan(\alpha_{sur1})}{T \cdot \tan(\alpha_{sur2})}. \quad (10)$$

In this example, where $\alpha_{sur2} = 30°$ and $\alpha_{sur1} = 120°$, the solution is N=6; that is, each ray passes through six different surfaces during one cycle.

It is important to note that the embodiment described above with regard to FIG. 5 is an example of a method for coupling the input waves into the substrate. However, input waves could also be coupled into the substrate by other optical means, including (but not limited to) folding prisms, fiber optic bundles, diffraction gratings, and others.

Also, in the example illustrated in FIG. 2, the input waves and the image waves are located on the same side of the substrate. Other configurations are allowed, however, in which the input and the image waves could be located on opposite sides of the substrate. There may even be applications in which the input waves can be coupled into the substrate through one of the substrate's lateral edges.

Figure 6A:
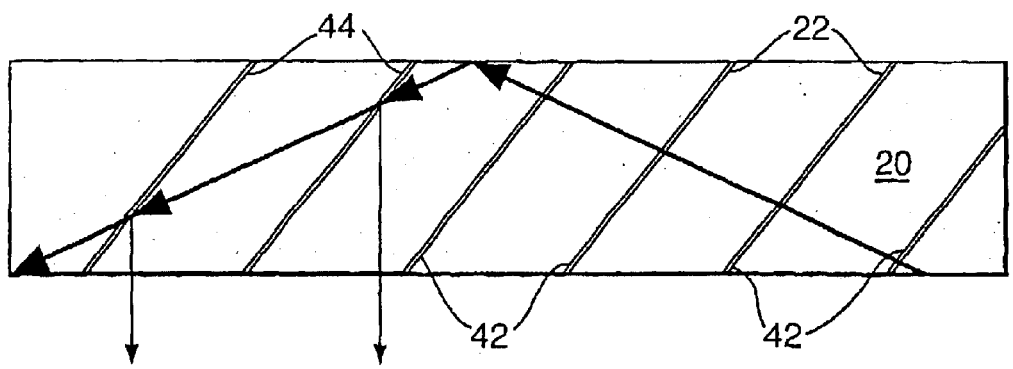

FIG. 6A is a detailed side view of an array of partially reflective surfaces which couples the light trapped inside the substrate out into the eye of a viewer. As can be seen, in each cycle the coupled ray passes through four reflecting surfaces 42, having a direction of $\alpha'_{sur2}=120°$, whereby the ray is normally incident to the surfaces and the reflections from these surfaces are negligible. In addition, the ray passes through two reflecting surfaces 44 having a direction of $\alpha_{sur2}=60°$, where the incident angle is 60° and part of the ray's energy is coupled out of the substrate. Assuming that only one array of six partially reflecting surfaces 22 is used to couple the light onto the viewer's eye, the maximal FOV is:

$$FOV_{max} \approx \frac{2T\tan\alpha_{sur1} - d_{eye}}{R_{eye}}. \quad (11)$$

Hence, for the same assumptions as we made above, the desired substrate thickness for an FOV of 8° is in the order of 4 mm; for the case in which the desired FOVs are 15° and 30°, substrate thicknesses of 5.3 mm and 8.2 mm, respectively, are achieved. Naturally, these are more reasonable values than the one received above for the other configurations. Moreover, more than one array of partially reflecting surfaces can be used. It is clear to see that by using two arrays of surfaces 22, comprising twelve partially reflecting surfaces, the desired substrate thickness for FOVs of 15° and 30° is in the order of 2.6 mm and 4.1 mm, respectively.

Figure 6B:
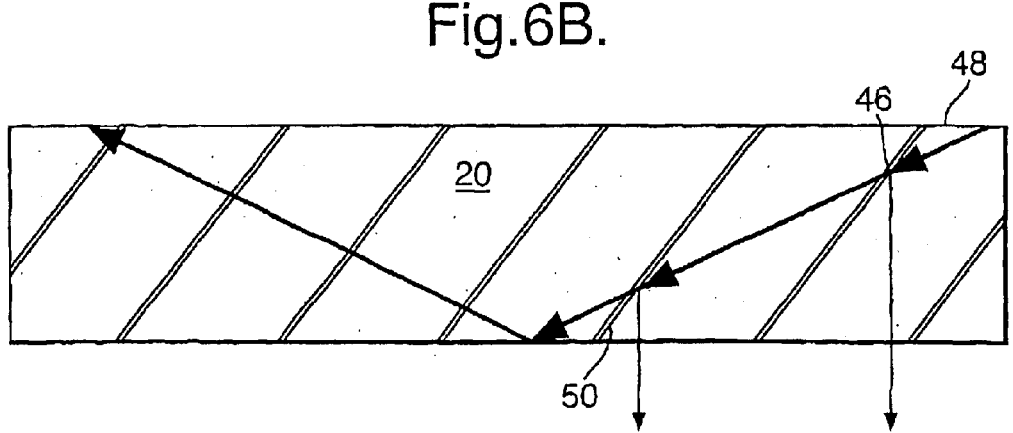

As illustrated in FIG. 6B, each partially reflecting surface is illuminated by optical rays of different energies. While the upper half of each surface 46 is illuminated by rays immediately after they are reflected from the upper surface 48 of the substrate 20, the lower half 50 of each surface is illuminated by rays that have already passed through one partially reflecting surface 46 and therefore have lower energy. Consequently, the brightness of the light which is reflected from the lower part of surface 50 is less than the brightness of the light which is reflected from its upper part 46. Apparently, this problem should be solved in order to achieve a display having uniform brightness. Indeed, coating the reflecting surface with two different coatings, whereby the reflectance of the upper part 46 will be lower than the reflectance of the lower part 50 so as to compensate for the non-even illumination, could solve this problem. For instance, if the desired nominal reflectance is 20%, the upper part will have this reflectance while the lower part will have a reflectance of 25%. However, in most cases, this problem can be completely neglected. If the substrate is not too thick, then for each viewing angle the light reflected onto the eye comes from a few reflecting surfaces. For instance, for $d_{eye}=4$ mm and T=4 mm, where $d_{eye}$ is the pupil diameter, the eye is illuminated by approximately two reflecting surfaces for each viewing angle. Since the eye integrates all the light which emerges from a single viewing angle and focuses at one point on the retina, and since the response curve of the eye is logarithmic, it is expected that the small variations, if any, in the display's brightness will not be noticeable.

Figure 7:
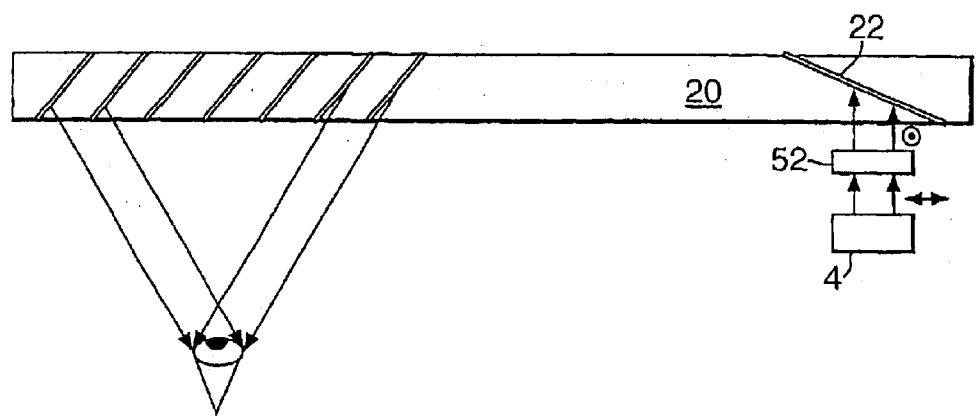

Another issue that should be taken into account is the polarization of the light. it is well known that it is simpler to design and fabricate reflecting surfaces for S-polarized light than for non-polarized or P-polarized light. Fortunately, some of the compact display sources (e.g., nematic liquid crystal displays) are linearly polarized. However, there are cases where the display source is oriented such that the incoming light is P-polarized in relation to the reflective surfaces. This problem can be easily solved by utilizing a half-wavelength plate. As illustrated in FIG. 7, the light emerging from the display source 4 is linearly P-polarized. By using a half-wavelength plate 52, it is possible to rotate the polarization such that the light is S-polarized in relation to the coupling reflective surface 22.

Figure 8:
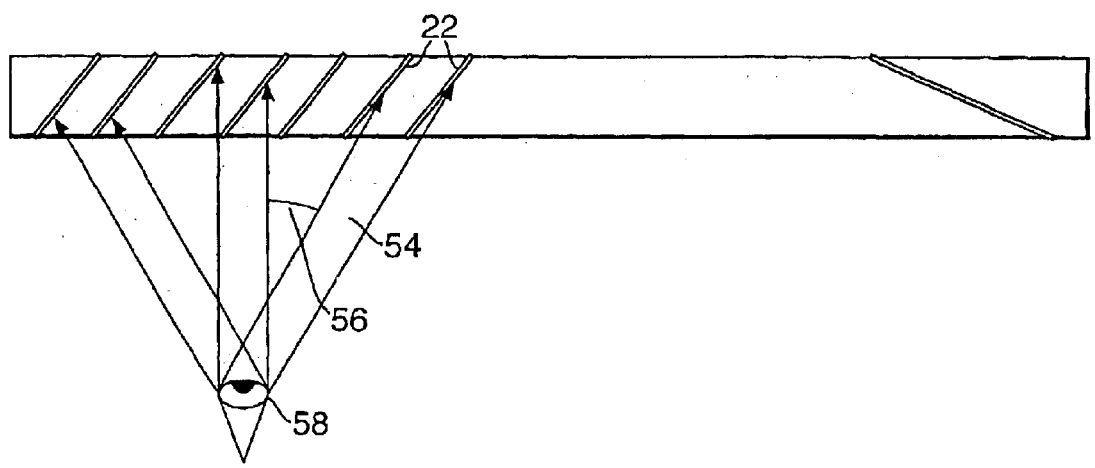

A further important issue is the uniformity of brightness as a function of the FOV. As shown in FIG. 4, the reflectance of each reflecting surface is increased with the viewing angle. Fortunately, since the pupil of eye is relatively small, this problem can be solved. FIG. 8 presents a side view of a head-mounted-display system based on the proposed configuration. A single plane wave 54, representing a particular viewing angle 56, illuminates only part of the overall array of partially reflecting surfaces 22. Thus, for each partially reflecting surface, a nominal viewing angle is defined, and the reflectance is designed according to this angle.

The exact, detailed design of the coatings of the various partially reflective surfaces is performed as follows: For each particular surface, a ray is plotted (taking into account the refraction due to Snell's Law) from the center of the surface to the center of the designated eye pupil 58. The calculated direction is set as the nominal incident direction and the particular coating is designed according to that direction. Hence, for each viewing angle, the average reflectance from the relevant surfaces will be very close to the desired reflectance.

Figure 9:
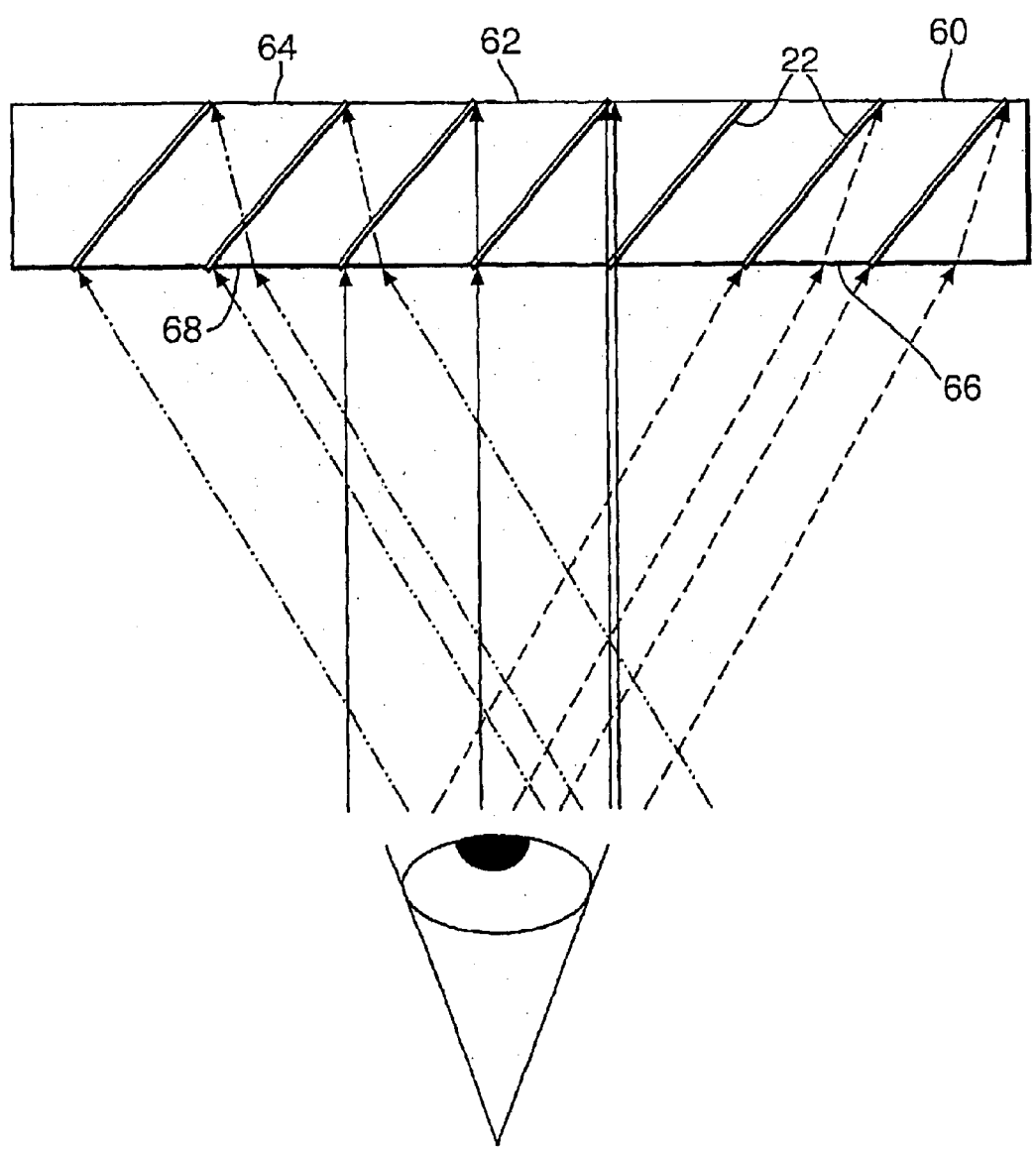

FIG. 9 presents a detailed side view of the reflectance from an array of partially reflective surfaces for three different viewing angles: the right-most 60, the central 62 and the left-most 64. As explained above, the projection of each surface is adjacent to its neighbor so as to avoid either overlapping or gaps between the reflecting surfaces. However, this is true only for the central viewing angle. For the right-most viewing angle, there are gaps 66 between the reflections, whereas there are overlappings 68 between the reflections of the left-most viewing angle. Setting different distances between each pair of adjacent surfaces 22 can solve this problem. That is, the distances will be smaller for the right portion 60 and larger for the left portion 64. However, foremost applications, this solution may be unnecessary, since for most of the desired FOVs, the gaps and the overlaps will be rather small (the viewing angles in FIG. 8 are highly exaggerated to illustrate this problem) and are expressed in a quite small increase (at the left side) or decrease (at the right side) of the reflected intensity. In addition, as described above, there is an opposite trend of higher reflections for the right surfaces 60. These two phenomena can therefore mutually compensate, at least partially.

Another issue to consider relates to display systems having a comparatively wide FOV, where at least two arrays of partially reflective surfaces 22 should be used. In this case, the waves which are reflected from the second array have already passed through the reflecting surfaces of the first array and at least part of the energy has been coupled out of the substrate. This issue should be considered for two different uses.

In see-through systems, such as head-mounted displays for pilots, wherein the viewer should see the external scene and the reflectance of the surfaces should not be very high, the coating design of the second array should take into account the energy loss in the first array. That is, the reflectance of the second array should be higher in order to achieve uniform brightness over the entire FOV. Since the reflectance coefficient is no longer constant, an undesired outcome of this solution might be expressed in a non-uniform image of the scene being viewed through the substrate. Fortunately, this non-uniformity is rather small. As can be seen in FIG. 4, the reflectance of each reflecting surface increases with the viewing angle. Hence, since the incident angle deviation between the viewing angles from the two arrays is expected to be at least 10°, the loss will be rather small. For instance, if the reflectance of an incident angle of 70° is 22%, then the reflectance of a ray having an incident angle of 60° should be in the order of 6–7%, and the total loss will be less than 15%. The change in transmittance of the substrate because of the necessary correction is actually negligible. For example, a change in reflectance from 22% to 25% yields a decrease of transmittance from 78% to 75%. In any case, for systems where the uniformity of the outer scene is crucial, a special non-uniform coating could be added on the external surface of the substrate, to compensate for the non-uniformity of the substrate and to achieve a view of uniform brightness over the entire FOV.

In non-see-through systems, such as virtual-reality displays, the substrate is opaque and the transmittance of the system has no importance. However, in such a case, the reflectance may be rather higher than before, and care must be taken in order to ensure that enough energy passes through the first array in order to achieve a display having uniform brightness over the entire FOV.

Figure 10:
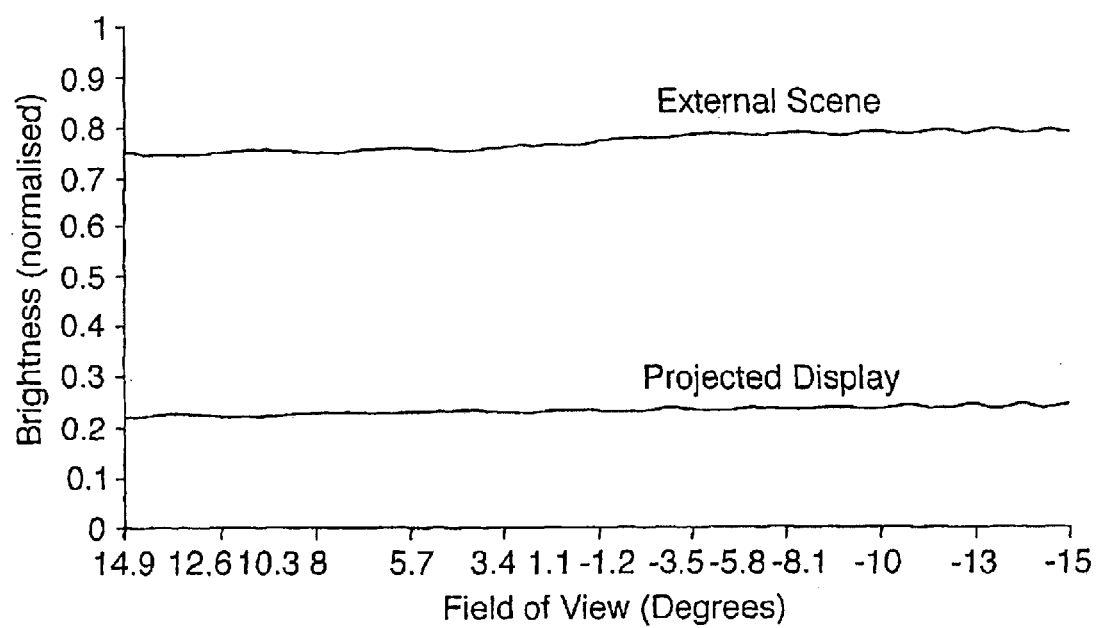

To illustrate the expected performance of a typical see-through system, a computer simulation has been performed, calculating the brightness of both the projected display and the external scene. The system has the following parameters: T=4 mm; $\alpha_{in}$=60°; FOV=30°; $R_{eye}$=40 mm, v=1.5; the number of arrays is two, and the nominal reflectance is 22%. FIG. 10 illustrates the results of these calculations, normalized to the requested nominal values. There are some small fluctuations in both graphs, but it is expected that these changes will be unnoticeable.

An alternative design method is to use the reflections from the rays having the second reflecting angle, namely, the rays with the off-axis angle of $\alpha'_{in}$=180°−$\alpha_{in}$. Inserting the parameters of Equation (7) into Equation (4) yields:

$$\alpha_{sur2} = \frac{\alpha_{in}}{2} = \frac{120°}{2} = 60°. \tag{12}$$

Figure 11:
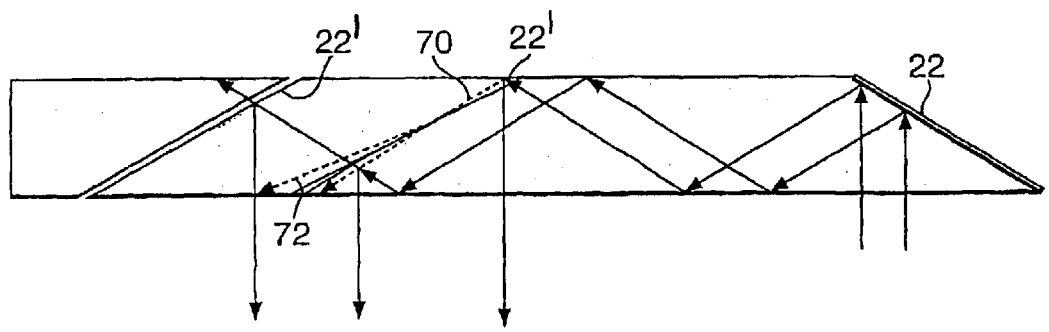

FIG. 11 illustrates a side view of this alternative design method. The first reflecting surface 22 is illuminated by a collimated display 4, 6 (FIG. 1) which is located behind the element. The reflecting surface reflects the incident light from the source such that the light is trapped inside the substrate by total internal reflection. After a few reflections inside the substrate, the trapped waves reach a parallel array of partially reflecting surfaces 22', which couples the light out of the substrate into the eye of the viewer.

The main drawback of this configuration is the undesired reflectance of the rays having an internal angle of $\alpha_{in}$.

Apparently, the, point in the display source, which is collimated to the incoming direction ε inside the substrate, is reflected into the directions $\alpha_{in}$+ε and $\alpha'_{in}$+ε inside the substrate. While the ray with the direction $\alpha'_{in}$+ε is reflected by the partially reflecting surfaces into the output direction ε, the ray 70 with the direction $\alpha_{in}$+ε is reflected by the partially reflecting surfaces 22' into the undesired output direction $\alpha_{in}$−ε. Ray 72 is then reflected in an undesired direction −ε to create a ghost image. Although only a small part of the beam is reflected in the undesired direction, the effect thereof becomes more significant as the FOV is increased; it can disturb the viewer, especially at the edges of the FOV.

Although the above-described undesired reflections cannot be avoided, the problem of ghost images can be solved by changing the angle of the first reflective surface 22. For instance, if this angle is changed to $\alpha_{sur1}$=63°, the other parameters of the system become:

$$\beta_{ref}=27°; \alpha_{in}=54°; \alpha'_{in}=136°; \alpha_{sur2}=63° \tag{13}$$

Hence, if the FOV of the system is 16° and the refractive index of the substrate is 1.5, the maximal off-axis angle of the image inside the substrate is 60°, the direction of the undesired reflection is 66°, and the output angle will be 18°, which is evidently outside the FOV and, with proper design, will not illuminate the exit pupil.

The above solution overcomes only the problem of ghost images. Part of the energy will still be reflected in undesired directions, which might decrease the efficiency and quality of the imaging. However, this alternative design method still has some advantages: first, the cross-section of each partially reflective surface 22' is much larger than it is in the previous embodiment. Hence, a given FOV requires a smaller number of surfaces. Second, not only are the required optical coatings simpler, but also the desired reflections can be achieved with the Fresnel reflections from the surfaces. That is, instead of coating the surfaces, a thin air gap may be inserted between the uncoated surfaces. Though this procedure is not the optimal one, acceptable results can be achieved with a much simpler fabrication process.

FIG. 12 illustrates the optical efficiencies of the, system as a function of the FOV, for two types of sources: one with non-polarized light, and one with S-polarized light. Though the efficiencies are not uniform in both cases, this problem can be solved by inserting a variable attenuator next to the display source. Hence, an uniform efficiency of 10% for non-polarized light and 15% for S-polarized light can be achieved.

It is easily possible to design optical coatings for achieving uniform illumination over the entire FOV. For example, if three partially reflective surfaces are used, their reflection can be designed to have 20%, 25% and 33% reflectance, respectively, which will yield uniform efficiency of 20% over the entire FOV.

Thus far, only the FOV along the ξ axis has been discussed. The FOV along the orthogonal η axis should also be considered. The FOV along the η axis is not dependent upon the size or number of the partially reflecting surfaces, but rather, on the lateral dimension along the η axis of the input waves coupled into the substrate. The maximum achievable FOV along the η axis is:

$$FOV_{max} \approx \frac{D_\eta - d_{eye}}{R_{eye} + l/(v\sin\alpha_{in})}, \tag{14}$$

wherein $D_\eta$ is the lateral dimension along $\eta$ axis of the input waves coupled into the substrate.

That is, if the desired FOV is 30°, then by using the same parameters used before, the necessary lateral dimension is found to be 42 mm. It was previously demonstrated that the lateral dimension along the $\xi$ axis of the input waves coupled into the substrate is given by $S_1 = T \tan(\alpha_{in})$. A substrate thickness of T=4 mm yields $S_1$=6.8 mm. Seemingly, there is a factor of more than 6 between the lateral dimensions along both axes. Even if it is assumed that there is an aspect ratio of 4:3 (as with a video display) and the FOV in the $\eta$ axis is 22°, the necessary lateral dimension is about 34 mm, and there is still a factor of 5 between the two axes. This discrepancy yields some problems, including the necessity of using a collimating lens with a high numerical aperture, or a very large display source. In any case, with such dimensions, it is impossible to achieve the desired compact system.

An alternative method for solving this problem is presented in FIG. 13. Instead of using an array of reflecting surfaces 22 only along the $\xi$ axis, another array of reflecting surfaces 22a, 22b, 22c is positioned along the $\eta$ axis. These reflecting surfaces are located normal to the plane of substrate 20 along the bisector of the $\xi$ and $\eta$ axes. The reflectances of these surfaces are determined so as to achieve uniform output waves. That is, if three reflecting surfaces are used, then the reflectances are set to be 33%, 50% and 100% for the first surface 22a, the second surface 22b and the third surface 22c, respectively. It is important to note that the arrangements shown in the array assemblies 22 and 22a–22c are only examples. Other arrangements for increasing the lateral dimensions of the optical waves in both axes, in accordance with the optical system and the desired parameters, are also permissible.

FIG. 14 presents a three-dimensional view of the overall substrate-guided optical configuration. The diffracted wave is expanded first along the $\eta$ axis and then along the $\xi$ axis. Since the projection of the input wave on the substrate plane is rotated by 90° with respect to the arrangement in FIG. 2, the lateral dimension $S_\eta$ along the $\eta$ axis of the central wave, after coupling into the substrate, is given by $S_\eta = 2S_1 = 2T \tan(\alpha_{in})$. To achieve a symmetrical coupled wave, it is preferable to choose a configuration whereby the coupled wave will have the same dimension in the $\xi$ axis. In that case, since the lateral dimension along the $\eta$ axis of the input waves before the coupling is $S_1 = T \tan(\alpha_{in})$, there will be a factor of 2 between the two dimensions. However, this factor is usually acceptable. After the reflection from the reflective surfaces 22a–22c, the lateral dimension along the $\eta$ axis is given by $S_\eta = 2NT \tan(\alpha_{in})$, wherein N is the number of the reflecting surfaces. The maximum achievable FOV along the $\eta$ axis is now:

$$FOV^\eta_{max} \approx \frac{S_\eta - d_{eye}}{R_{eye} + l/(\nu \sin\alpha_{in})} = \frac{2NT \tan(\alpha_{in}) - d_{eye}}{R_{eye} + l/(\nu \sin\alpha_{in})}. \quad (15)$$

Since the reflecting array 22a–22c can be located closer to the eye, it is expected that the distance l between the reflecting surfaces will be smaller than previously. Assuming that l=30 mm, and choosing the parameters: T=4 mm; N=3; $\alpha_{in}$=60°; $R_{eye}$=40 mm and $\nu$=1.5, the resultant FOV will be:

$$FOV^\eta_{max} \approx 30°. \quad (16)$$

This is a better result than that achieved previously.

As a result of the requested beam expansion, the brightness of the optical waves has been reduced by a factor of N. However, this effect may be minimized by the same method as described above. As shown in FIG. 15, the incident angles of the lower portion 76 of the FOV, which should be reflected from the first reflecting surface 22a, are larger than the reflecting angle of the higher portion 78 of the FOV, which should be reflected mainly from the last reflecting surface 22c. In that case, it is possible to design, as before, a reflecting coating having higher reflectance coefficients for higher angles of incidence. Since the energy loss of the higher portion 78 of the FOV can be much smaller, higher reflectance coefficients might be chosen for the first reflective surfaces 22a, and the brightness reduction would be smaller. The exact details of the requested design depend on the various parameters of each particular system.

It is not necessary to be limited to the use of a single light-transmissive substrate 20 only; additional substrates can be used. For example, three different substrates, the coating of each being designed for one of the three basic colors, can be combined to produce a three-color display system. In that case, each substrate is transparent with respect to the other two colors. Such a system can be useful for applications in which a combination of three different monochromatic display-sources is required in order to create the final image. In addition, there are many other examples in which several substrates can be combined together to form a more complicated system.

FIG. 16 illustrates a compact, substrate-guided, head-mounted display configuration constructed in accordance with the present invention. The illustrated configuration is composed of three arrays of reflecting surfaces. The first reflecting surface 22 couples the light emerging from input display source 4 and collimated by lens 6 into a substrate 20, where the light distribution is expanded in one direction. The second array of partially reflective surfaces 22a, 22b, 22c reflects the rays, and the light distribution is then expanded in the other direction. The third array 22d, 22e, 22f couples the light from the substrate outwards into the eyes of the viewer 24.

FIG. 17 illustrates an alternative method for expanding the bean in the $\eta$ direction. Here, the expansion is performed outside, rather than inside, the substrate 20. A beam splitter 80 splits the light from display source 4 into two parts: one part is transmitted directly to substrate 20, while the second part is reflected to a mirror 82 and then reflected again to substrate 20. Both parts of the light, which now construct a wider beam than the original one, are then coupled by the reflecting surface 84 into the substrate. A larger number of beamsplitters and mirrors can be utilized to enlarge the incoming beam in the T direction. A collimating lens 81 may be introduced between the display source 4 and the beam splitter 80.

FIG. 18 illustrates a slightly modified version of FIG. 17. It is well-known that it is simpler to design and fabricate reflecting surfaces for S-polarized light than it is for non-polarized or P-polarized light. If the light from display source 4 is indeed S-polarized, it is possible to perform the reflections in the proper directions by inserting half wavelength plates 86 into the optical paths, as shown in the Figure.

Instead of the display source 4 being oriented parallel with the substrate 20, it can just as well be oriented normal to the substrate 20, as shown in FIGS. 19 and 20.

Another possible embodiment is shown in FIG. 21. The display source 4 is oriented normal to the substrate 20 and the light can be inserted into the first coupling-in mirror by using a folding mirror or a reflecting prism 83. This folding mirror or reflecting prism 83 can have an optical power on the reflecting surface and/or on the faces of the reflecting prism, enabling it to perform collimating operations, thus saving the necessity to use another collimating element.

The advantages of this substrate-guided visor display configuration are as follows:

1) Since the input display source can be located very close to the substrate, the overall configuration can be very compact and lightweight.

2) Unlike other visor display configurations, here there is much flexibility as to where the input display source can be situated relative to the final eyepiece. Hence, the regular off-axis configuration is avoided and the field aberrations can be compensated relatively easily and efficiently.

3) The reflectance coefficients of the partially: reflective surfaces are almost constant over the entire relevant spectrum. Hence, not only monochromatic, but also polychromatic, light sources may be used as display sources, thus achieving a color, head-mounted display.

4) Since each point from the input display is transformed into a plane wave that is reflected into the eye of the viewer from a large part of the reflecting array 22d–22f, the tolerances on the exact location of the eye can be significantly relaxed. As such, the viewer can see the entire field of view, and the eye-motion-box can be significantly larger than in other visor display configurations.

5) Since a large part of the energy coupled into the SGOD is "recycled" and coupled out into the eye of the viewer, a display of comparatively high brightness can be achieved.

FIGS. 22 and 23 illustrate an embodiment of the present invention in which the substrates 90 are mounted inside a spectacle frame 92. The display source 4, the collimating lens 6, and the folding minor 82 are assembled inside the arm portions 94 of the spectacles, just next to the edge of the optical substrate 90. For a case in which the display source is an electronic element such as a small CRT or LCD, the driving electronics 93 for the display source might be assembled inside the back portion of the arm 94. A power supply 96 is connectable to arm 94 by a lead 97.

Since the input waves coupled into the substrate are usually collimated plane waves, some novel techniques might be utilized for its use as the required display source. One possible display is a virtual retinal display (VRD), that is, a system where a plane wave is rapidly scanned to create an image directly in the retina of the viewer. Another possible display could be based on the similar idea of Fourier-transform holography. Utilizing this principle, a LCD creates the Fourier transform of the requested image, rather than the image itself. When the LCD is illuminated by a coherent plane wave emerging from a small laser-diode, a collimated image of the desired figure will be formed on the LCD plane. This image could be used as the input for the SGOD.

The above-described embodiment can serve in both see-through systems and non-see-through systems in which opaque layers are located in front of the optical elements. An alternative method is to use a variable filter in front of the system in such a way that the viewer can control the level of brightness of the light emerging from the external scene. This variable filter could be either a mechanically controlled device such as a folding filter, or two rotating polarizers, an electronically controlled device, or even an automatic device, whereby the transmittance of the filter is determined by the brightness of the external background.

There are some alternatives as to the precise way in which SGOD can be utilized in this embodiment. The simplest option is to use a single element for one eye. Another option is to use an element and a display source for each eye, but with the same image. Another version of this option is to project two different parts of the same image, with some overlapping between the two eyes, enabling the achievement of a wider FOV. The most complicated possibility is to project two different scenes, one to each eye, in order to create a stereoscopic image. With this alternative, attractive implementations are possible, including 3-dimensional movies, advanced virtual reality, training systems and others.

It is important to emphasize that the embodiment of FIGS. 22 and 23 is just an example illustrating the simple implementation of the present invention. Since the substrate-guided optical element, constituting the core of the system, is very compact and lightweight, it could be installed in a vast variety of arrangements. Hence, many other embodiments are also possible including a visor, a folding display, a monocle, and many more.

The embodiment illustrated in FIGS. 22 and 23 is designated for applications where the display should be head-mounted or head-carried. However, there are applications where the display should be located in another place. An example of such an application is a cellular phone, which is expected in the near future to perform novel operations, including videophone, Internet connection, access to electronic mail, and even the transmission of high-quality television satellite broadcasting. With the existing technologies, a small display could be embedded inside the phone, however, at present, such a display can project either video data of poor quality only, or a few lines of Internet or e-mail data directly into the eye.

FIG. 24 illustrates an alternative method, based on the present invention, of projecting high quality images directly into the eye of the user. A folding SGOD 98 is integrally attached to the body of a cellular phone 100, in a manner similar to that by which the mouthpiece is usually attached. A small display source 102, embedded in the phone, projects a video image 104 which is transmitted through an optical relay 106, which could be either a folding mirror, a small prism, a bundle of fiber optics, or any other relay, onto the SGOD 98. In this way, during the operation, the user can unfold SGOD 98, locate it in front of his eye, and conveniently view the desired image.

It is important to note that the embodiment described in FIG. 24 is only an example, illustrating that applications other than head-mounted display can be materialized. Other possible hand-carried arrangements include small displays embedded into wristwatches, a pocket-carried display having the size and weight of a credit card, and many more.

The embodiments described above are monocular optical systems, that is, the image is projected onto a single eye. However, there are applications, such as head-up displays (HUD), wherein it is desired to project an image onto both eyes. Until recently, HUD systems have been used mainly in advanced combat and civilian aircraft. There have been numerous proposals and designs, of late, to install a HUD in front of a car driver in order to assist in driving navigation or to project a thermal image into his eyes during darkness or other low visibility conditions. The main problem with existing aerial systems is that they are very expensive, the price of a single unit being in the order of hundreds of thousands of dollars. Obviously, this price must be reduced by a factor of three orders of magnitude in order to make it compatible with the passenger car consumer market. In addition, the existing systems are very large, heavy, and bulky, and are too complicated for installation in a car. The candidate for consumer HUDs should be very compact, inexpensive, and be easily installed inside existing vehicles.

FIG. 25 illustrates a method of materializing an HUD system based on the present invention. The light from a display source 4 is collimated by a lens 6 to infinity and coupled by the first reflecting surface 22 into substrate 20. After reflection at a second reflecting array (not shown), the optical waves impinge on a third reflecting array 22', which couples the light out into the eyes 24 of the viewer. The overall system can be very compact and lightweight, of the size of a large postcard having a thickness of a few millimeters. The display source, having a volume of a few cubic centimeters, can be attached to one of the corners of the substrate, where an electric wire can transmit the power and data to the system. It is expected that the installation of the presented HUD system will not be more complicated than the installation of a simple commercial audio system. Moreover, since there is no need for an external display source for image projection, the necessity to install components in unsafe places is avoided.

Since the distance between the eyes and the surface, and the diameter of the exit pupil, are much larger than they are for monocular displays, it is expected that a larger number of reflecting surfaces 22' and/or a thicker substrate 20 will be needed to achieve the desired FOV. An alternative method for accomplishing an HUD system having a larger FOV for a given system, is illustrated in FIG. 26. Instead of defining the exit pupil of the system at the designated location of the viewer's eyes, a virtual exit pupil 108 is defined, having a smaller diameter at a closer location to the substrate. As can be seen, the right part 110 of the FOV is seen only by the left eye, while the left part 112 of the FOV is seen only by the right eye. The central part 114 of the FOV is seen by both eyes. Such a solution is widely accepted in military HUD systems, wherein the pupil of the optical system is located at the collimating lens and, as such, the instantaneous FOV (IFOV) is smaller than the total FOV (TFOV). In this kind of configuration, each eye sees a different part of the TFOV, with an overlap at the center of the TFOV. The overall FOV seen by both eyes is much larger than that seen by each single eye. Regarding the embodiment of FIG. 26, the exact location and size of the virtual exit pupil will be set according to the specific parameters and the desired performance for each particular system.

Since the exit pupil of a typical HUD system is much larger than that of a head-mounted system, it is expected that a three-array configuration, as described above with reference to FIG. 14, will be needed to achieve the desired FOV, even for the configuration described above with reference to FIG. 26. However, there may be some special cases, including systems with small vertical FOVs, or with a vertical LED array as a display source, in which a two-array configuration (as described above with reference to FIG. 2) would suffice.

The embodiments illustrated in FIGS. 25 and 26 can be implemented for other applications, in addition to HUD systems for vehicles. One possible utilization of these embodiments is as a flat display for a computer or television. The main unique characteristic of such a display is that the image is not located at the screen plane, but is focused to infinity or to a similarly convenient distance. One of the main drawbacks of existing computer displays is that the user has to focus his eyes at a very close distance of between 40 and 60 cm, while the natural focus of a healthy eye is to infinity. Many people suffer from headaches after working for a long duration of time at a computer. Many others who work frequently with computers tend to develop myopia. In addition, some people, who suffer from both myopia and hyperopia, need special spectacles for work with a computer. A flat display, based on the present invention, could be an appropriate solution for people who suffer from the above-described problems and do not wish to work with a head-mounted display.

Another advantage of the display of the present invention is its very flat shape, even compared to the existing flat-panel displays. It is true that, unlike conventional displays, the display of the invention has a limited head-motion-box in which the entire image can be seen. However, such a limited head-motion-box may be sufficient for convenient operation by a single user.

Another possible embodiment of the invention is its use as a text projector for a speaker or TV broadcaster, who is supposed to look at his audience and read text simultaneously. Utilizing the present invention, the speaker would be able to use a transparent plate held next to his face, projecting the requested text into his eyes without being seen by the audience.

Yet another possible implementation of this embodiment is as a screen for a personal digital assistance (PDA). The size of the existing conventional screens which are presently used is about 10 cm. Since the minimal distance where these displays can be read is in the order of 40 cm, the obtainable FOV is about 15°; hence, the projected information from these displays is quite limited. A significant improvement in the projected FOV can be made with the embodiment illustrated in FIGS. 25 and 26. Since the image is collimated to infinity, the screen can be located much closer to the eyes of the viewer. In addition, since each eye sees a different part of the TFOV, with an overlap at its center, another increase in the TFOV may be achieved. Therefore, a display with an FOV of 40° or larger is easily achievable.

In all of the embodiments of the invention described above, the image which was transmitted by the SGOD originated from an electronic display source such as a CRT or LCD. However, there are applications where the transmitted image can be a part of a living scene, for example, in spectacles for people who suffer from both myopia and hyperopia, and whose problems are not always conveniently solved by conventional bi-focal or multifocal spectacles. An alternative solution is to use ophthalmic lenses which have a few focal lengths. These lenses create multiple images on the viewer's retina. The brain then accommodates to the sharpest image.

FIG. 27 illustrates a method for implementing a lens having dual focal length, based on the present invention. A scene image 114 from infinity is coupled into a substrate 20 by a reflecting surface 22 and then reflected by an array of partially reflective surfaces 22' into the eye 24 of the viewer. Another scene image 116 from a close distance is collimated to infinity by a lens 118 and then passed through the substrate 20 into the eye. The ophthalmic lens 120 focuses images 114 and 116 to a convenient distance and corrects other aberrations of the viewer's eye, including astigmatism. When the external scene is close to the viewer, scene 116 will have a sharp image on the retina, while scene 114 will be blurred. Hence, the brain will automatically accommodate to the sharp image of scene 116; vice-versa, when the external scene is far away, image 114 will be the sharpest and the brain will then accommodate to it.

The present invention can be also be used to combine two totally different scenes. There are numerous uses wherein such a device can be useful, including for pilots or drivers who want to see the front and the rear scenes simultaneously, a sportsman who wishes to see different views of the field, a painter who wishes to combine a real scene with his picture, a student who copies text from a chalkboard, and many more. FIG. 28 illustrates a method of combining two different parts of the external scene into the eye of the viewer, according to the present invention. A scene image 120 from an oblique direction is folded, e.g., by a prism or any other optical means 122, coupled into substrate 20 by a reflecting surface 22, and then reflected by an array of partially reflective surfaces 22' into the eye 24 of the viewer, at which point it is combined with the regular scene 124.

It is important to note that, for the embodiments described in FIGS. 27 and 28, since the optical waves 114 and 120 which are coupled into the SGOD come from infinity and do not have to be focused by a lens or any similar optical element, the lateral dimensions of the coupled waves carry no importance. Hence, a simpler SGOD, having only two reflecting arrays, as described in FIG. 2, can be used, rather then the more complicated embodiment of FIG. 14 having three-arrays.

The embodiments described with regard to FIGS. 27 and 28 are merely examples illustrating the implementation capabilities of the present invention. It is possible to combine any two different images with a SGOD, images originated from live scenes, from electronic-derived displays (e.g. combining a video camera with a thermal imaging device), or any other possible combination.

In all of the above-described embodiments, the SGOD is utilized to transmit light waves for imaging purposes. The present invention, however, can be applied not only for imaging, but also for non-imaging applications, mainly illumination systems, in which the optical quality of the output wave is not crucial and the important parameters are intensity and uniform brightness. The invention may be applied, for example, in back illumination of flat-panel displays, mostly LCD systems, in which, in order to construct an image, it is necessary to illuminate the plate with a light as bright and uniform as possible. Other such possible applications include, but are not limited to, flat and non-expensive substitutes for room illumination or for floodlights, illuminators for fingerprint scanners, and read-out waves for 3-dimensional display holograms.

FIG. 29 illustrates a compact SGOD beam-expander configuration for illumination purposes, constructed in accordance with the present invention. The illustrated configuration is composed of a first reflecting surface 126, a second array of reflecting surfaces 128 and a third reflecting array 130. The input wave 132 is a plane wave normally incident on substrate 20, while the output wave 134 is a plane wave having a significantly larger diameter than that of the input wave. Such a system can be implemented as a very thin, compact illuminating device for comparatively large areas.

The operation of a SGOD beam-expanding configuration is similar to that described above for other configurations of the invention. Nevertheless, there are some differences between the imaging and non-imaging systems. First, since there is no need to worry about "ghost images" in non-imaging system devices, the input waves can be coupled parallel to the substrate plane; hence, each partially reflecting plane can be uniformly illuminated. Second, in non-imaging systems, the transmittance of the substrate has no importance, and therefore only the reflectance distribution should be considered.

In addition, instead of the design goal of an uniform FOV, the design goal for non-imaging systems is to achieve an uniform intensity of the output wave. In order to do so, the reflectance of the partially reflecting array 130 increases gradually along the $\xi$ axis, such that during each reflection, only part of the energy of the trapped optical waves is coupled out. FIG. 30 illustrates the intensity of the output wave, the reflectance of the surfaces and the amount of energy left in the substrate as a function of the propagation distance inside the substrate along the $\xi$ axis, for a typical substrate-guided beam-expander.

Since the light can be coupled parallel to the substrate plane in illumination devices, it can be coupled through one of the edges of the substrate. In addition, it is not necessary to be limited to the use of a single light source; many sources may be used. Furthermore in such devices, it is not necessary for the light waves to be collimated. Diverging input beams can also be utilized to create a diverging output wave. FIGS. 31A and 31B illustrate two possible configurations for illumination purposes, one having two arrays of partially reflective surfaces (FIG. 31A), and one having one such array (FIG. 31B). In these configurations, the light source is an array of LEDs 136 collimated by a lenslet array 138 and coupled into the substrate through one of the substrate edges, creating uniform light illumination which is coupled out by the array 140.

FIG. 32 illustrates a method of fabricating the array of partially reflecting surfaces. First, a group of prisms 142 is manufactured, having the requested dimensions. These prisms can be fabricated from silicate-based materials such as BK-7 with the conventional techniques of grinding and polishing, or alternatively, they can be made of polymer or sol-gel materials using injection-molding or casting techniques. The appropriate surfaces of these prisms are then coated with the required optical coatings 144. Finally, the prisms are glued together to create the desired SGOD. In applications in which the quality of the optical surfaces is critical, the final step of polishing the outer surfaces 146 can be added to the process.

FIG. 33 illustrates another method of fabricating the array of partially reflecting surfaces. Two similar, tooth-shaped transparent forms 148 are fabricated by injection-molding or casting. The required coatings 150 are applied to the appropriate surfaces of one of the forms and the two forms are then glued together, to create the requested SGOD 152.

FIG. 34 illustrates yet another version of the method described in FIG. 33 for fabricating the array of partially reflecting surfaces. Instead of coating the forms 148 with the coating 150, the coating is applied to a very thin and flexible polymer sheet 154. The sheet is inserted between forms 148, which are then glued together to create the requested SGOD 156.

FIG. 35 illustrates yet another method of fabricating an array of partially reflecting surfaces. The surfaces of a plurality of transparent flat plates 158 are coated with the required coatings 160 and then the plates are glued together so as to create a cubic form 162. A segment 164 is then sliced off the cubic form by cutting, grinding and polishing, to create the desired SGOD 166.

There are cases in which the uniformity of the output light is not critical. In those cases, instead of coating the reflective surfaces, it is possible to leave air gaps between them, allowing the light to be coupled out by Fresnel reflections from the surfaces. In such a case, however, there might be a problem of uniformity of the output intensity, but this problem can be solved by using two plates illuminated from opposite directions. Another possible solution is to coat opposite edges and the outer surface with reflective coating.

As described above, there are applications in which it is important to have non-uniform coatings on the reflecting surfaces. FIG. 36 illustrates a method of achieving such a requirement. Two different arrays of partially reflecting surfaces are fabricated by any of the methods described above, or by any other method, the reflectance in the lower array 168 being higher than it is in the upper array 170. The two arrays are then glued together, to create the requested SGOD 172.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising:
    a light transmitting substrate having at least two major surfaces and edges; optical means for coupling light into said substrate by total internal reflection, and
    a plurality of partially reflecting surfaces located in said substrate, characterized in that said partially reflecting surfaces are parallel to each other.

2. The optical device according to claim 1, wherein said optical means is a wave-reflecting surface located in said substrate.

3. The optical device according to claim 1, wherein said plurality of partially reflecting surfaces couples the light trapped by total internal reflection out of said substrate.

4. The optical device according to claim 1, further comprising means for producing output waves from input waves, wherein said input waves and output waves are located on the same side of said substrate.

5. The optical device according to claim 1, further comprising means for producing output waves from input waves, wherein said input waves are located on one side of said substrate and said output waves are located on another side of said substrate.

6. The optical device according to claim 1, further comprising means for producing output waves from input waves, wherein said input waves are coupled into said substrate through one of its edges.

7. The optical device according to claim 1, wherein the reflectance of said plurality of partially reflecting surfaces is determined to achieve a field of view having uniform brightness.

8. The optical device according to claim 1, wherein the reflectance of said plurality of partially reflecting surfaces is determined to achieve a field of view having predefined brightness.

9. The optical device according to claim 1, wherein the reflectance of each of said partially reflecting surfaces is non-uniform across the reflecting surfaces, to achieve a field of view having predefined brightness.

10. The optical device according to claim 1, wherein the distances between said partially reflecting surfaces are determined to achieve a field of view having predefined brightness.

11. The optical device according to claim 1, further comprising a second plurality of partially reflecting surfaces located in said substrate, said second plurality of partially reflecting surfaces being parallel to each other and not being parallel to said first plurality of partially reflecting surfaces.

12. The optical device according to claim 11, wherein said second plurality of partially reflecting surfaces changes the direction of propagation of the light coupled in said substrate by total internal reflection.

13. The optical device according to claim 11, wherein the reflectance of said second plurality of partially reflecting surfaces is determined to achieve a field of view having uniform brightness.

14. The optical device according to claim 11, wherein the reflectance of said second plurality of partially reflecting surfaces is determined to achieve a field of view having predefined brightness.

15. The optical device according to claim 1, wherein said substrate is partially transparent, for allowing see-through operation.

16. The optical device according to claim 1, further comprising an opaque surface disposed so as to block the entrance of light traversing the substrate, from an external scene.

17. The optical device according to claim 1, further comprising a variable transmittance surface disposed so as to attenuate the entrance of light traversing the substrate, for controlling the brightness of light passing through said device from an external scene.

18. The optical device according to claim 17, wherein the transmittance of said variable transmittance surface is automatically determined according to the brightness of light directed to traverse the substrate.

19. The optical device according to claim 2, wherein said plurality of partially reflecting surfaces reflects trapped waves into a direction calculated to reach one eye of an observer.

20. The optical device according to claim 2, wherein said plurality of partially reflecting surfaces reflects trapped waves into a direction calculated to reach both eyes of an observer.

21. The optical device according to claim 20, wherein each of said observer's eyes sees only part of the total field of view.

22. The optical device according to claim 1, wherein said device combines two different reproductions of the output at two different focal depths.

23. The optical device according to claim 1, wherein said device combines at least two different aspects of the external scene.

24. The optical device according to claim 1, wherein said plurality of partially reflecting surfaces is located in said substrate in such a way that at least one of the lateral dimensions of the light emerging from said substrate is larger than the light entering said substrate.

25. The device according to claim 24, wherein the reflectivities of said two pluralities of partially reflecting surfaces are set to achieve output waves having a uniform intensity.

26. The device according to claim 24, wherein the reflectivities of said two pluralities of partially reflecting surfaces are set to achieve output waves having a predefined intensity.

27. The optical device according to claim 1, further comprising a virtual retinal display source.

28. The optical device according to claim 1, further comprising an electronic display source, operating in such a way that the Fourier transform of the desired image is created in the plane of said display source.

29. The optical device according to claim 1, further comprising an array of light-emitting diodes constituting a light source.

30. The optical device according to claim 29, wherein said light source is coupled into the substrate through its edge.

31. The optical device according to claim 1, wherein said substrate is composed of a plurality of prisms.

32. The optical device according to claim 1, wherein said substrate is composed of a plurality of transparent forms created by injection molding techniques.

33. The optical device according to claim 1, wherein said substrate is composed of a plurality of parallel plates.

34. The optical device according to claim 1, wherein said partially reflecting surfaces are composed of flexible sheets coated with optical coatings.

35. The optical device according to claim 1, further comprising air gaps between at least two of said partially reflecting surfaces.

36. The optical device according to claim 1, wherein optical coatings are applied to at least portions of one or more of the said surfaces or edges of the substrate to form partially reflective surfaces.

37. The optical device according to claim 1, further comprising at least one half-wavelength plate inserted into the optical path of said device.

38. The optical device according to claim 1, wherein the reflectance of said plurality of partially reflecting surfaces is effected by Fresnel reflections.

39. The optical device according to claim 1, further comprising an array of at least two reflective surfaces located outside of said light-transmitting substrate.

40. The optical device according to claim 1, further comprising several different substrates combined together to form an optical system.

41. The optical device according to claim 1, wherein said device is mounted in an eyeglass frame.

42. The optical device according to claim 1, wherein said device is located in a mobile communication device.

43. The optical device according to claim 1, wherein said partially reflecting surfaces are non-parallel to said major surfaces of the substrate.

44. The optical device according to claim 1, wherein said major surfaces of the light transmitting substrate are parallel to each other.

45. The optical device as claimed in claim 1 further comprising a spatial pattern source and suitable collimating means.

46. The optical device as claimed in claim 1 further comprising a dynamic image source and suitable collimating means.

* * * * *